United States Patent [19]

Yamakawa et al.

[11] Patent Number: 5,801,844
[45] Date of Patent: Sep. 1, 1998

[54] IMAGE PROCESSING APPARATUS

[75] Inventors: Shinji Yamakawa, Kawasaki; Yukio Sakano, Tokyo; Hiroshi Takahashi; Kounosuke Maruyama, both of Kawasaki, all of Japan

[73] Assignee: Ricoh Company, Ltd., Tokyo, Japan

[21] Appl. No.: 457,312

[22] Filed: Jun. 1, 1995

Related U.S. Application Data

[63] Continuation of Ser. No. 43,736, Jul. 7, 1993, abandoned.

[30] Foreign Application Priority Data

Apr. 9, 1992 [JP] Japan .................................. 4-088843

[51] Int. Cl.$^6$ .......................... H04N 1/48; H04N 1/387; G06K 9/42; G06K 9/54
[52] U.S. Cl. ........................ 358/450; 358/447; 358/448; 382/258; 382/306
[58] Field of Search ........................ 358/450, 447, 358/401, 468, 448, 296, 459, 451; 382/306, 258, 256, 317, 257, 298; 235/462

[56] References Cited

U.S. PATENT DOCUMENTS

| | | | |
|---|---|---|---|
| 4,010,446 | 3/1977 | Kawa | 340/146.3 H |
| 4,494,862 | 1/1985 | Tanaka | 355/14 C |
| 4,868,676 | 9/1989 | Matsuura et al. | 358/296 |
| 5,032,928 | 7/1991 | Sakai | 358/448 |
| 5,039,847 | 8/1991 | Morii et al. | 235/379 |
| 5,068,741 | 11/1991 | Takahashi | 358/444 |
| 5,105,283 | 4/1992 | Forest | 358/401 |
| 5,113,248 | 5/1992 | Hibi | 358/75 |
| 5,121,195 | 6/1992 | Seki | 358/75 |
| 5,153,737 | 10/1992 | Kobayashi | 358/452 |
| 5,159,635 | 10/1992 | Wang | 380/51 |
| 5,165,072 | 4/1991 | Kurita et al. | 358/448 |
| 5,181,127 | 7/1990 | Ogino | 358/443 |
| 5,191,443 | 3/1993 | Nagaoka | 358/452 |
| 5,204,752 | 3/1992 | Yamakawa | 358/296 |
| 5,274,468 | 12/1993 | Ojha | 358/448 |
| 5,296,896 | 3/1994 | Nishiyama et al. | 355/208 |
| 5,299,029 | 3/1994 | Moriya et al. | 358/447 |
| 5,420,699 | 5/1995 | Yamanouchi et al. | 358/487 |
| 5,455,648 | 10/1995 | Kazami | 354/106 |
| 5,680,225 | 10/1997 | Hirabayashi et al. | 358/451 |

Primary Examiner—Kim Yen Vu
Assistant Examiner—Kimberly A. Williams
Attorney, Agent, or Firm—Oblon, Spivak, McClelland, Maier & Neustadt, P.C.

[57] ABSTRACT

An image processing apparatus which can produce improved quality copies by taking into account the effects which normally occur when successive copies of copies are made. When a document is to be copied, image information is input to a processing device relating to certain parameters associated with the image characteristics such as, for example, the toner density, thickness of the image information, type of copier used, amount of toner available at the time of copying, etc. This image information is then stored on the document copy in the form of a bar code which will change as successive copies of copies are made in such a way that the image quality of the copies is not degraded. The image information contained on the document via the bar code is combined with new input image information supplied by an operator, whereby the two sets of information are combined in a central processing unit in order to determine the necessary amount of correction processing required to compensate for the fact that the image has been reproduced a number of times whereby copies are made from previous copies. In this manner, the original document quality can be maintained.

13 Claims, 22 Drawing Sheets

| 1/16 | 1/16 | 1/16 |
|---|---|---|
| 1/16 | 1/16 | 1/16 |
| 1/16 | 1/16 | 1/16 |

| 3/32 | 3/32 | 3/32 |
|---|---|---|
| 3/32 | 3/32 | 3/32 |
| 3/32 | 3/32 | 3/32 |

↓ THINNING IN SUBSCAN DIRECTION

↓ THINNING IN MAIN SCAN DIRECTION

THICKENING IN SUBSCAN DIRECTION

THICKENING IN MAIN SCAN DIRECTION

SHADOW

↓ THICKENING IN SUBSCAN DIRECTION

↓ THICKENING IN MAIN SCAN DIRECTION

THINNING IN
SUBSCAN DIRECTION

THINNING IN
MAIN SCAN DIRECTION

IMAGE PROCESSING APPARATUS

This application is a Continuation of application Ser. No. 08/043,736, filed on Apr. 7, 1993, now abandoned.

BACKGROUND OF THE INVENTION

The present invention relates to a copier, facsimile apparatus, printer or similar image processing apparatus and, more particularly, to an image processing apparatus feasible for the generation of images derived from the same original document, i.e., generation images to be reproduced by, for example, a digital copier.

In the modern image reproducing art including a stencil type printer as well as a copier, importance is attached to the faithful and attractive reproduction of images. With a copier, for example, it often occurs that after a person has copied an original document (first document) to produce a copy (second document), another person copies the second document to obtain a duplicate thereof (third document). The problem with such generation of images is that the image quality is sequentially lowered. For example, lines forming characters become thicker or thinner every time they are copied, eventually making the characters illegible. This is also true with photographs. Further, assume that a document carrying both of characters and photographs thereon is copied in a character mode, and then the resulting duplicate is copied in the character mode. Then, the photographs are noticeably blurred and become unidentifiable when the reproduction is repeated several times in the character mode. Conversely, in the generation images of such a document produced in a photograph mode, the characters are critically blurred.

SUMMARY OF THE INVENTION

It is, therefore, an object of the present invention to provide an image processing apparatus capable of minimizing the degradation of generation images.

In accordance with the present invention, an image processing apparatus comprises an image reading section for reading an image, a recording section for recording the image read by the image reading section, and a control section for combining input image data with image processing information representative of processing applied to the input image data.

Also, in accordance with the present invention, an image processing apparatus comprises an image reading section for reading an image, a recording section for recording an image read by the image reading section, an information reading section for reading image processing information recorded in a document, a setting section for setting image quality conditions including a filter, gamma correction and tone processing on the basis of the image processing information read by the information reading section, and a selecting section for determining whether or not to select the information reading section and setting section.

BRIEF DESCRIPTION OF THE DRAWINGS

The above and other objects, features and advantages of the present invention will become more apparent from the following detailed description taken with the accompanying drawings in which:

FIGS. 20A–20C demonstrate a specific thinning procedure included in the thickening and thinning processing;

FIGS. 22A–22C are indicative of a specific thickening procedure included in the thickening and thinning processing;

DESCRIPTION OF THE PREFERRED EMBODIMENTS

Figure 1:
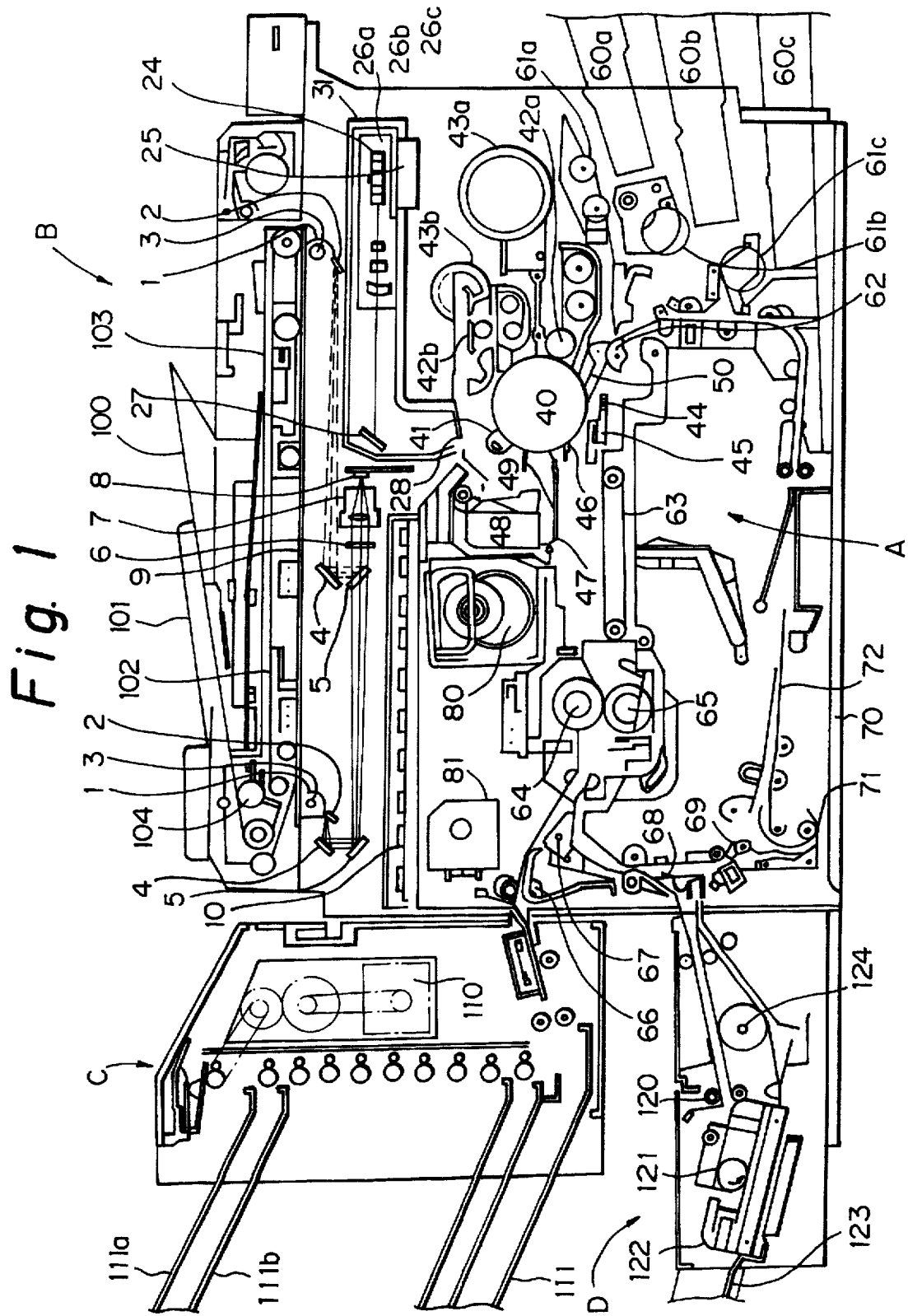
FIG. 1 is a section showing an image processing apparatus embodying the present invention.

Referring to FIG. 1 of the drawings, an image processing apparatus embodying the present invention is shown which is implemented as a digital copier by way of example. As shown, the copier is generally made up of a copier body A, an ADF (Automatic Document Feeder) B, a sorter C, and a two-sided copy unit or duplex copy unit D.

The copier body A includes a scanner section, a writing section, a photoconductive element section, a developing section, a sheet feed section, etc.

The scanner section has a first scanner loaded with a reflector 1, a light source 3 and a first mirror 2 movable at a constant speed, and a second scanner 2 loaded with a second and a third mirror 4 and 5 and movable in synchronism with and at half the speed of the first scanner. As the two scanners optically scan a document, not shown, laid on a glass platen 9, the resulting reflection is focused onto a monodimensional solid state image sensor 8 via a color filter 6 and a lens 7.

While the light source 3 may be implemented by a fluorescent lamp or a halogen lamp, use is generally made of a fluorescent lamp due to the inherently stable wavelength and long life thereof. Although a single light source 3 is shown in the figure, it may be replaced with two or more light sources, as needed. Since the image sensor 8 has a predetermined sampling clock, the fluorescent lamp has to be turned on at a frequency higher than the sampling frequency so as to avoid adverse influence on images.

Usually, the image sensor 8 is constituted by a CCD (Charge Coupled Device) array. As the image sensor 8 generates an image signal which is an analog signal, an analog-to-digital converter transforms it to a digital image signal. An image processing board 10 executes various kinds of image processing (conversion to bilevel or multilevel, tone processing, magnification change, editing, etc.) with the digital image signal, thereby producing a digital signal in the form of a group of spots.

To produce color image data, the color filter 6 is movable into the optical path extending from the document to the image sensor 8 and capable of transmitting only the image data of particular color. Specifically, every time the color filter 6 is moved into or out of the optical path in synchronism with the scanning of the document, a multitransfer function, two-sided or duplex copy function or similar function may be executed to produce any of various kinds of copies.

On receiving the processed image data, the writing section scans a photoconductive drum 40 by the raster scanning of a laser beam to write the data in the form of a group of beam spots. It has been customary to implement the laser beam with an He-Ne laser since it has a wavelength of 633 nm well matching the sensitivity of a conventional photoconductive element. However, an He-Ne laser is very expensive and makes the apparatus complicated since it cannot be directly modulated. Recently, the increase in the sensitivity of a photoconductive element in the long wavelength range has made it possible to use a semiconductor laser which is inexpensive and can be directly modulated. The embodiment also uses a semiconductor laser.

Figure 2:
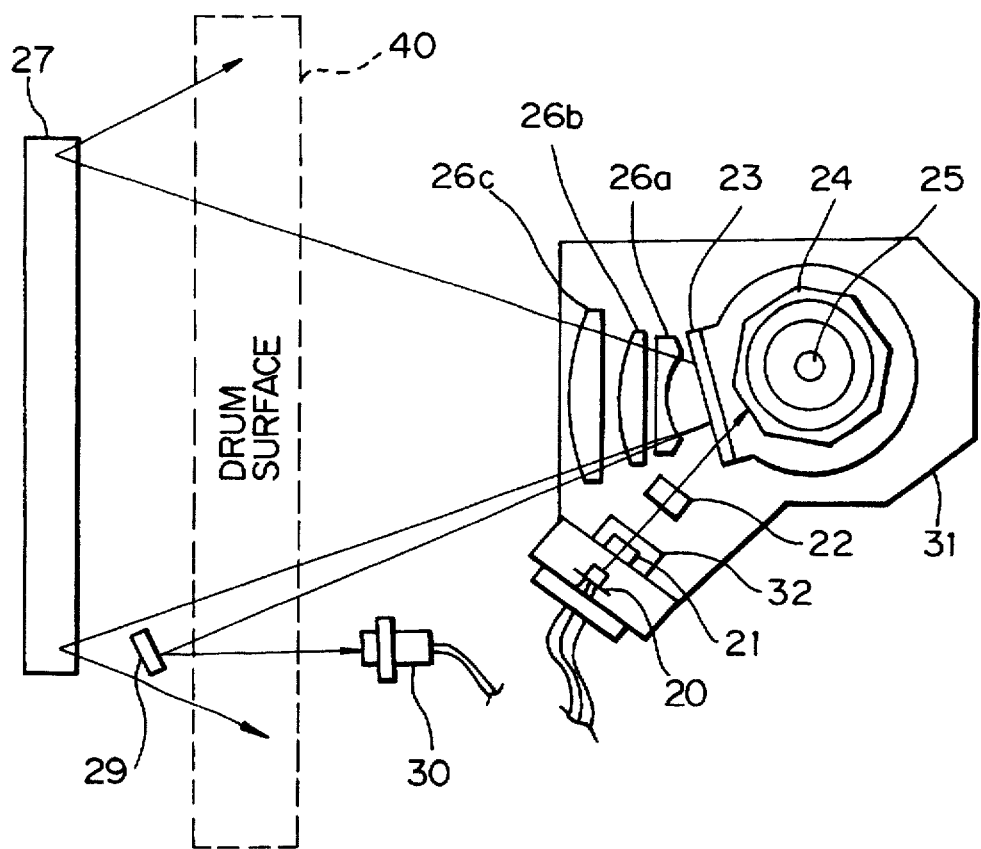
FIG. 2 is an enlarged plan view of a writing section included in the embodiment.

FIG. 2 shows a specific arrangement of the writing section. As shown, a laser beam issuing from a semiconductor laser 20 is collimated by a collimating lens 21 and then shaped by an aperture 32 to have a predetermined configuration. The shaped laser beam is compressed in the subscanning direction by a first cylindrical lens 22 and is then incident on a polygonal mirror 24. The polygonal mirror 24 is provided with an accurate polygonal shape and is driven at a constant speed in a predetermined direction by a mirror motor 25. The rotation speed of the mirror 24 is determined by the rotation speed and writing density of the drum 40, and the number of faces of the mirror 24.

The laser beam incident on the polygonal mirror 24 is steered by the rotation of the mirror 24. The laser beam from the mirror 24 is sequentially propagated through f-theta lenses 26a, 26b and 26c. These lenses 26a–26c cause the laser beam having a predetermined angular velocity to scan the drum 40 at a constant speed, focus the beam on the drum 40 as a minimum beam spot, and compensate for irregularities which may exist in the configuration of the polygonal mirror 24.

The laser beam coming out of the f-theta lens 26c is reflected by a mirror 29 located at the outside of an image area to reach a beam input section 30. An optical fiber conducts the laser beam from the input section 30 to a sensor section. In response, the sensor section generates a synchronizing signal indicative of the write start position in the main scanning direction. On the elapse of a predetermined period of time after the generation of the synchronizing signal, one line of image data is outputted. Such a procedure is repeated to form a single image on the drum 40.

The drum 40 located in the photoconductive element section has a photoconductive layer thereon. While the photoconductive element sensitive to the beam from the semiconductor laser (wavelength of 780 nm) may be implemented by an organic photoconductor (OPC), α-Si or Se-Te by way of example, the embodiment uses OPC. Regarding laser writing, there are available a negative-to-positive (N/P) process which illuminates an image portion and a positive-to-positive (P/P) process which illuminates the background. The embodiment uses the N/P process by way of example.

A main charger 41 is of scorotron type having a grid on the drum side. The main charger 41 uniformly charges the surface of the drum 40 to negative polarity. The laser beam scans a portion of the charged surface of the drum 41 where an image should be formed, thereby lowering the potential. As a result, a potential ranging from −750 V to −800 V and a potential of about −500 V are respectively deposited on the background and the image portion of the drum 40, forming an electrostatic latent image. A developing unit 42a or 42b is applied with a bias voltage of −500 V to −600 V and deposits a negatively charged toner on the latent image to convert it to a toner image.

The developing units, i.e., main and auxiliary developing units 42a and 42b are located in the developing section. When an image is to be developed only in black, the auxiliary developing unit 42b and a toner supply unit 43b associated therewith are removed. In the embodiment, the main developing unit 42a and a toner supply unit 43a associated therewith store a black toner while the auxiliary developing unit 42b and toner supply unit 43b store a color toner. While one of the developing units 42a and 42b is in operation, the other developing unit is held inoperative, e.g., by having the main pole thereof shifted.

The above-stated developing system, the color selective image reading using the color filter 6, and the multitransfer and duplex copy functions available with a sheet transport system may be combined in a desired manner to effect color copying or color editing. For development in three or more colors, a corresponding number of developing units may be arranged around the drum 40, or a revolver accommodating such developing units therein may be used.

A transfer charger 44 transfers the toner image formed o n the drum 40 to a sheet fed in synchronism with the rotation of the drum 40 by applying a negative charge to the rear of the sheet. The sheet carrying the toner image is separated from the drum 40 by a separation charger 45 held integrally with the transfer charger 44.

The toner remaining on the drum 40 after the image transfer is removed by a cleaning blade and collected in a tank 48. Further, the potential pattern also remaining on the drum 40 is erased by light from a lamp 49.

A photosensor 50 is located in a position immediately downstream of the developing position with respect to the direction of rotation of the drum 40. The photosensor 50 is made up of a light emitting element and a photosensitive element and senses the reflection density of the surface of the drum 40. Specifically, a particular pattern, e.g., a black pattern or a mesh pattern is written on the drum 40 at the writing section in such a position that the photosensor 50 can read it. After the particular pattern on the drum 40 has been developed, an image density is determined on the basis of a ratio of the reflectance of the pattern to the reflectance of the other area. If the image density is low a toner supplement signal is generated. A condition wherein the amount of remaining toner is low may be detected when the image density does not increase despite the supplement of the toner.

The sheet feed section includes a plurality of, three in the embodiment, cassettes 60a, 60b and 60c. A sheet fed from any one of the cassettes 60a-60c and carrying an image on one side thereof may be routed through a refeed loop 72 to form an image on the other side thereof or to refeed it. Specifically, as the operator selects one of the cassettes 60a-60c and then presses a start button, a pick-up roller 61 (61a, 61b or 61c) associated with the cassette is rotated to feed a sheet until the sheet abuts against a register roller 62 which is then held in a stop condition. The register roller 62 starts rotating in synchronism with the image formed on the drum 40 to drive the sheet toward the drum 40. After the toner image has been transferred from the drum 40 to the sheet, a separation and transport section 63 transports it to a position between a heat roller 64 and a pressure roller 65 while sucking it. The two rollers 64 and 65 cooperate to fix the toner image on the sheet.

In an ordinary copy mode, the sheet with the toner image is steered by a pawl or path selector 67 toward an out l e t contiguous with the sorter C. In a multiplex copy mode, the sheet is sequentially steered by pawls or path selectors 68 and 69 toward the refeed loop 72 without being driven out to the sorter C. As a result, the sheet is again routed through the refeed loop 72 to the register roller 62.

To produce a two-sided copy, the copier body A is used either singly or in combination with the duplex copy unit D. Let the following description concentrate on a mode using the copier body A only. The sheet steered downward by the pawl 67 is further directed downward by the pawl 68 and then steered by a pawl 69 to a tray 70 via the refeed loop 72. Then, the sheet is fed in the reverse direction by a roller 71, steered by the pawl 69 to the refeed loop 72, and then driven toward the register roller 62.

The ADF B automatically feeds documents to the glass platen 9 one by one and, after each document has been copied, drives it out. Specifically, sheets stacked on a table 100 are neatly positioned by side guides 101 in the widthwise direction. A pick-up roller 104 feeds one of the documents while separating it from the others. A transport belt 102 conveys the document to a predetermined position on the glass platen. After the document has been copied a desired number of times, it is driven out to a tray 103 by the belt 102. The size of the documents can be detected in terms of the position of the side guides 101 and the document transport time.

The sorter C has bins 111a-111x to which sheets or copy sheets sequentially coming out of the copier body A may be distributed in order of page or page by page by way of example.

A plurality of rollers are driven by a motor 110 to drive the copy sheets to particular bins 111 selected by pawls which are associated with such bins.

The duplex copy unit D will be operated as follows. The copier body A cannot produce more than a single two-sided copy at a time when operated alone, as stated earlier. When combined with the duplex copy unit D, the copier body A is capable of producing a plurality of two-sided copies collectively. Specifically, to produce two-sided copies collectively, the sheet directed downward by the discharge roller 66 is steered to the duplex copy unit D by the pawl 67. On entering the unit D, the sheet is stacked on a tray 123 by a discharge roller 120. At this instant, a feed roller 121 and side guides 122 position the sheet in the longitudinal and lateral directions. Such sheets sequentially stacked on the tray 123 are refed by a refeed roller 124 at the time of rear copying. At this time, the pawl 69 steers the sheets directly to the refeed loop 72. There are also shown in FIG. 1 a mirror 27, a dust-proof glass 28, a lens support unit 31, a sheet separating member 46, a main motor 80, and a fan motor 81.

Figure 3:
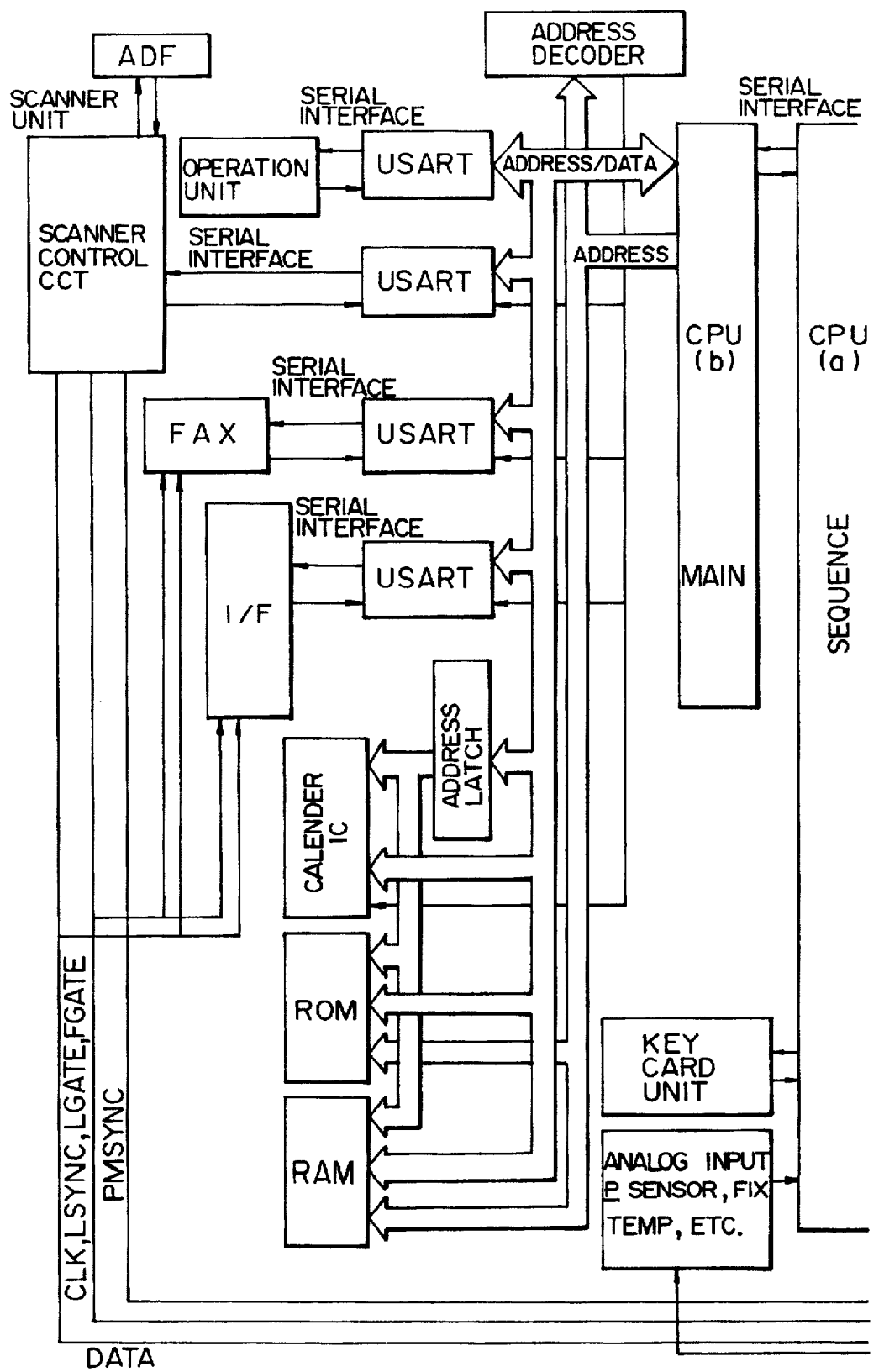
FIGS. 3 and 4 are block diagrams schematically showing, when combined, a control system included in the embodiment.
Figure 4:
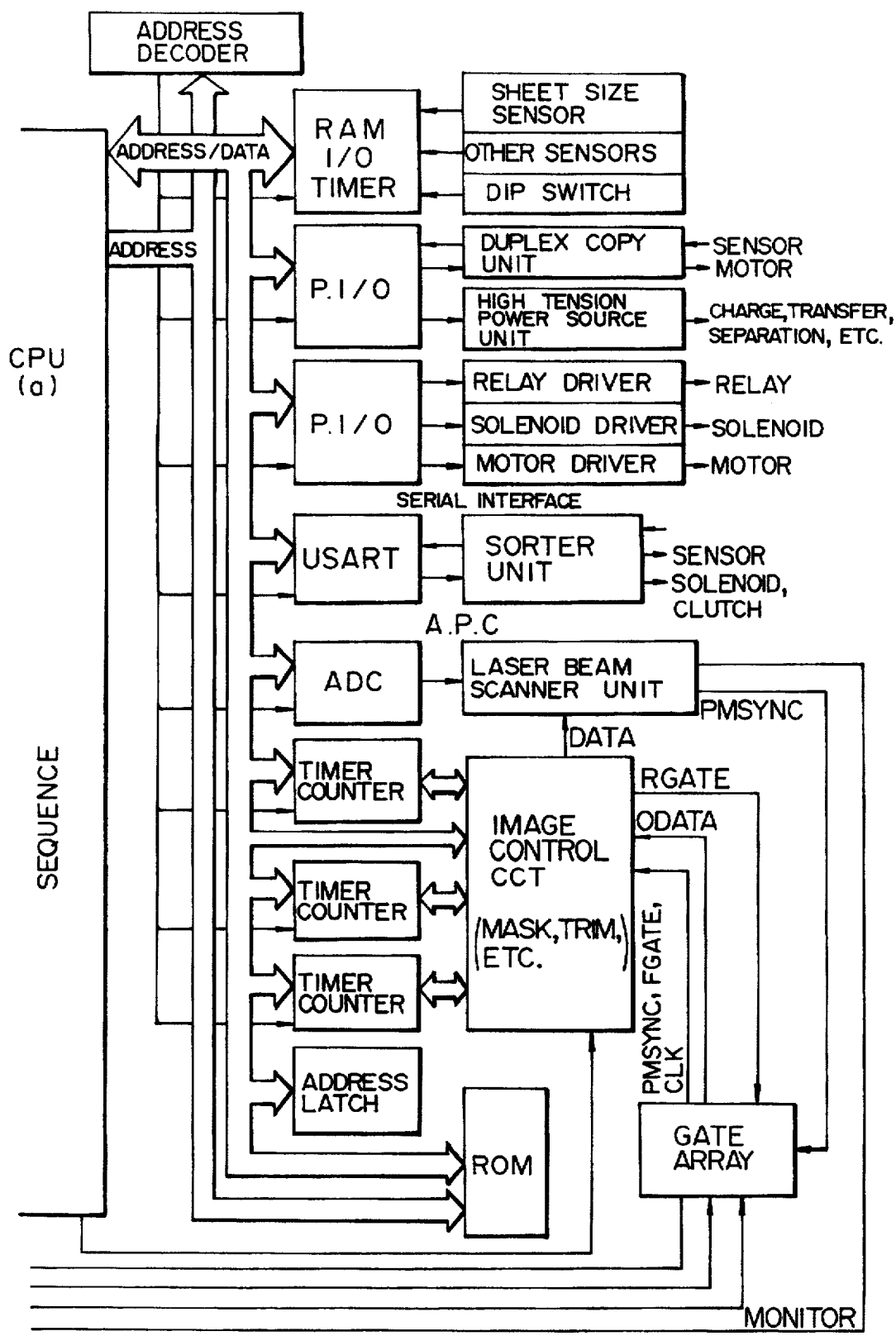

FIGS. 3 and 4 in combination show a control system included in the embodiment. As shown, the control system includes two CPUs (Central Processing Units) (a) and (b) which are assigned to sequence control and operation control, respectively. The CPUs (a) and (b) are interconnected by a serial interface (RS232C).

The sequence CPU (a) sets and outputs sheet transport timings and conditions relating to image formation. Connected to the CPU (a) are a sheet size sensor, sensors response to sheet discharge and registration, the duplex copy unit, a high tension power source unit, drivers including relays, solenoids and motors, the sorter unit, the laser beam scanner unit, etc. The sheet size sensor senses the size and orientation of sheets stacked on a cassette and generates an electric signal representative of the result. The other sensors include sensors responsive to oil, toner and other supplies, and sensors responsive to mechanical errors including a door open state and the blow-out of a fuse.

The duplex copy unit includes a motor for positioning sheets in the widthwise direction, a sheet feed clutch, a solenoid for changing a transport path, a sheet sensor, a side fence home position sensor, and sensors relating to sheet transport. The high tension power source unit applies a particular high voltage to each of the main charger, transfer charger, separation charger and bias electrode for development by a duty derived from the PWM (Pulse Width Modulation) control of the output thereof. The drivers include a sheet feed clutch, registration clutch, counter, motor, toner supplement solenoid, power relay, and fixing heater. The sequence CPU (a) is connected to the sorter unit by a serial interface to cause it to distribute sheets to bins at a predetermined timing.

The sequence CPU (a) has an analog input to which are fed back a fixing temperature, photosensor output, laser diode monitor output, laser diode reference voltage, and various high tension power source outputs. Specifically, in response to the output of a thermistor located in the fixing section, the CPU (a) ON/OFF controls or controls the phase of the heater such that the temperature of the fixing section remains constant. Regarding the photosensor output, as a phototransistor senses a photopattern formed at a predetermined timing, the CPU (a) determines the density of the pattern and ON/OFF controls a toner supplement clutch to control the toner concentration. The analog inputs to the analog-to-digital converter and CPU (a) are used to maintain the power of the laser diode constant. Specifically, the control is such that when the laser diode is turned on, the monitor voltage coincides with a reference voltage (3 mW in the embodiment).

The image control circuit generates timing signals for masking, trimming, erasure and photosensor pattern and delivers a video signal (VDATA) to the laser beam scanner unit. In response to the signal VDATA, the laser beam scanner unit effects PWM to again transform the signal VDATA to an analog signal and turns on the laser diode by the resulting pulse. As a result, a single pixel, multitone latent image is electrostatically formed on the photoconductive element.

A gate array synchronizes the image signal from the scanner to a synchronizing (sync) signal PMSYNC from the laser beam scanner unit, converts the image signal to a signal (ODATA) synchronous to a write start signal RGATE, and delivers the signal ODATA to the image control circuit.

The operation CPU or main CPU (b) controls a plurality of serial ports and a calendar IC (Integrated Circuit). Connected to the plurality of serial ports are an operating section, the scanner control circuit (reading unit), a facsimile section (FAX) and an interface unit as well as the sequence CPU (a). The operating section includes a display for displaying information entered on keys by the operator and the status of the copier. Specifically, the inputs on the keys are serially sent to the main CPU (b) which then turns on the display. The main CPU (b) interchanges information relating to image processing and image reading with the scanner and interchanges predetermined information with the FAX section and interface unit. The calender IC stores date and time and can be called by the main CPU (b) any time. Hence, the calender IC may be used to display the current time on the display or to ON/OFF control the machine automatically on the basis of times set beforehand.

Figure 5:
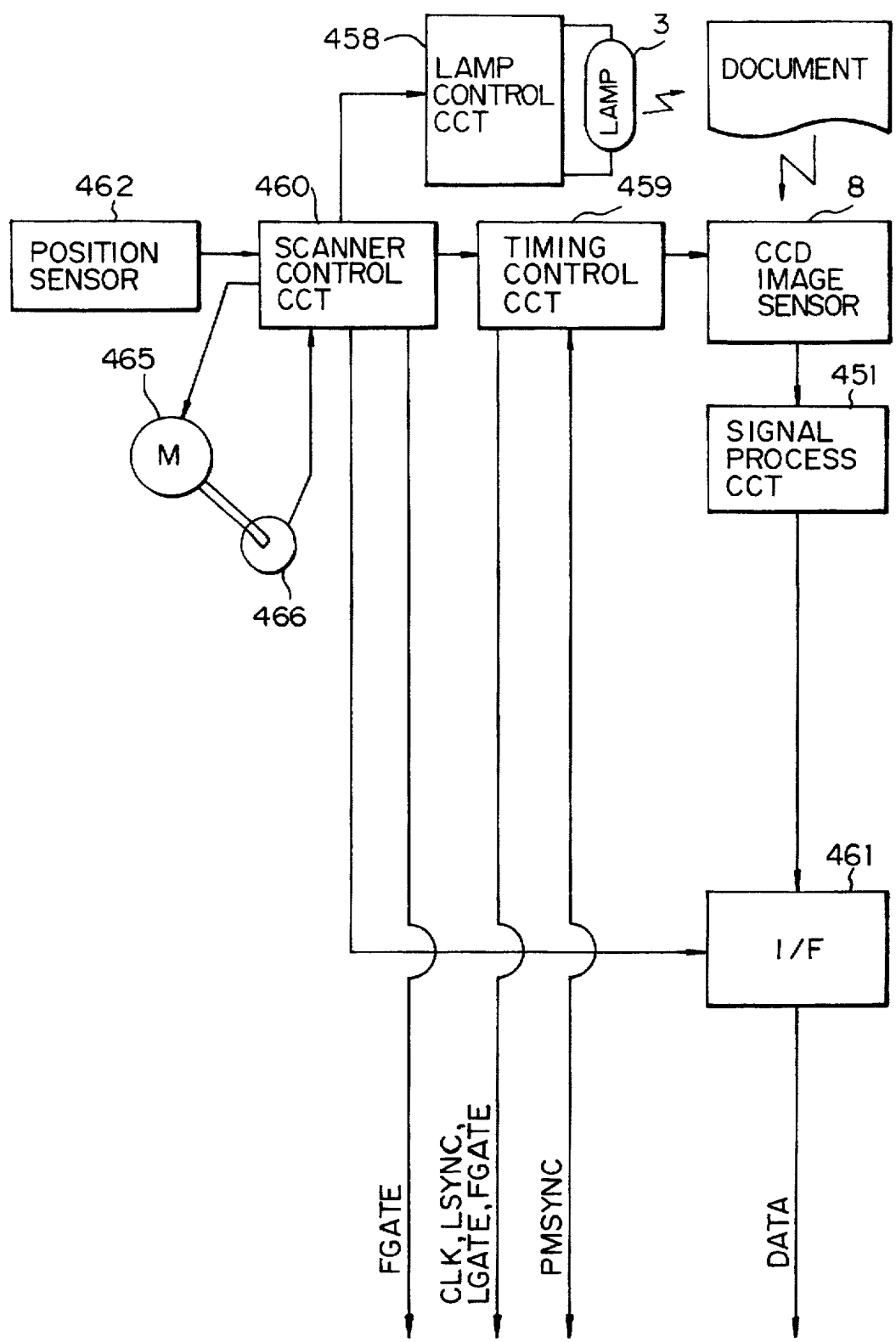
FIG. 5 is a block diagram schematically showing an image scanner section whose major constituent is a scanner control circuit included in the system of FIG. 3.

FIG. 5 shows the image scanner section specifically. As shown, a scanner control circuit 460 controls a lamp control circuit 458, a timing control circuit 459 and a scanner motor 465 in response to commands from a printer control section. In response to the command from the scanner control circuit 460, the lamp control circuit 458 turns on and turns off the fluorescent lamp 3 while controlling the quantity of light. The timing control circuit 459 is operable with the calender IC in the above-stated fashion. A rotary encoder 466 is connected to the output shaft of the scanner motor 465. A position sensor 462 is responsive to the reference position of a vertical scan drive mechanism. The analog image signal from the CCD image sensor 8 is subjected to analog-to-digital conversion and other processing at a signal processing circuit 451 and then sent to the writing section via an interface (I/F) 461.

The timing control circuit 459 generates various timing signals as instructed by the scanner control circuit 460. Specifically, when the scanner starts reading a document, the timing control circuit 459 sends to the CCD image sensor 8 a transfer signal for transferring one line of data to a shift register and shift clock pulses for shifting the data bit by bit in the shift register. Also, the timing control circuit 459 sends pixel sync clock pulses CLK, main scan sync pulses LSYNC, and main scan valid period signal LGATE. The pixel sync pulses CLK are substantially identical with the shift clock pulses applied to the CCD image sensor 8. While the main scan sync pulses LSYNC are substantially identical with the main scan sync signal PMSYNC which the beam sensor of the laser beam scanner unit generates, it is not outputted when image is not read. The main scan valid period signal LGATE goes high at the time when the output data is regarded valid.

On receiving a read start command from the main CPU (b), the scanner control circuit 460 turns on the lamp 3, starts driving the scanner motor 465, and controls the timing control circuit 459 to cause the CCD image sensor 8 to start reading a document. Further, the scanner control circuit 460 sets a subscan valid period signal FGATE at a high level. The signal FGATE goes low on the elapse of a period of time necessary for the maximum readable length in the subscanning direction (lengthwise dimension of A4 size in the embodiment) to be scanned.

Figure 6:
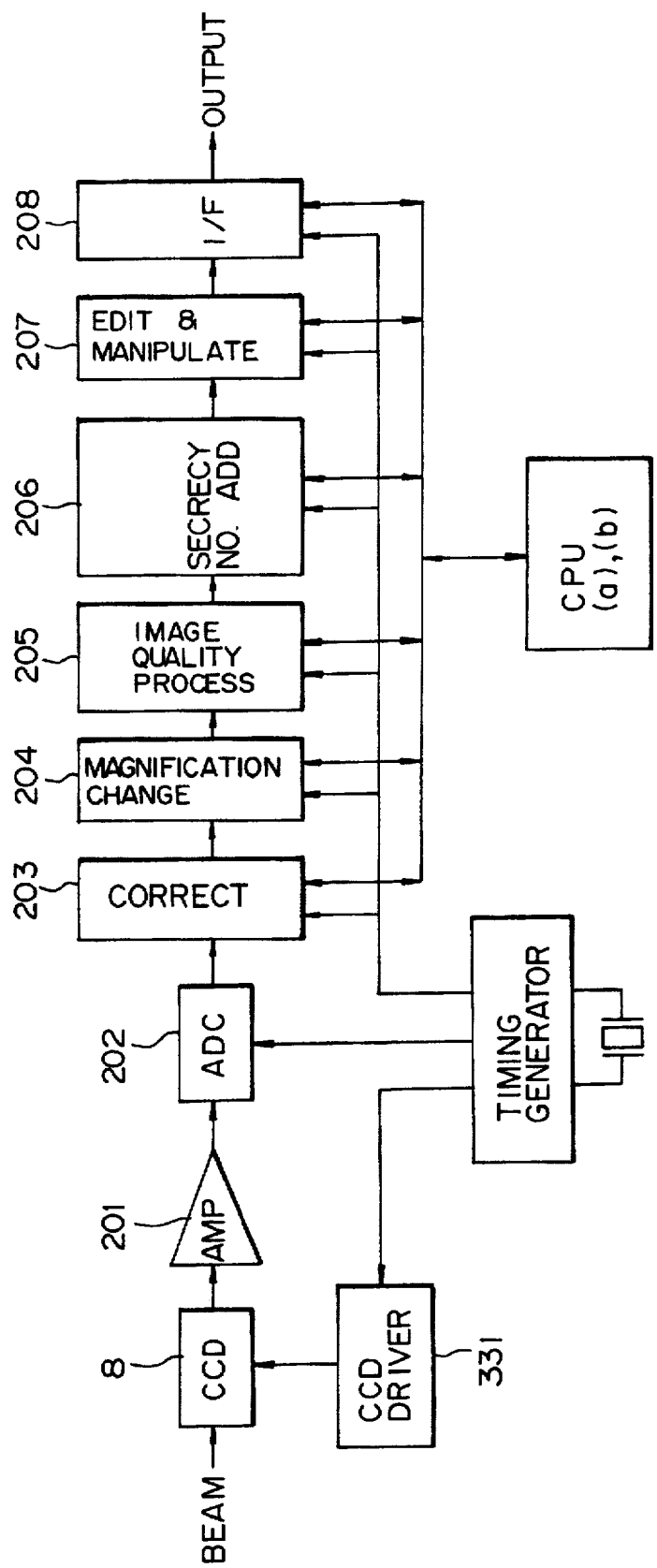
FIG. 6 is a block diagram schematically showing a signal processing section whose major component is the scanner control circuit of FIG. 3 and an image control circuit of FIG. 4.

FIG. 6 shows signal processing circuitry (scanner control circuit+image control circuit) specifically. As shown, the analog image signal from the CCD image sensor 8 is amplified by an amplifier (AMP) 201 and then converted to digital image data (e.g. six bits or eight bits) by an analog-to-digital converter (ADC) 202. A correction circuit 203 subjects the digital image data to black setoff, shading correction, MTF (Modulation Transfer Function) correction, smoothing and other processing. A magnification change circuit 204 changes the magnification of the corrected image data in the main scanning direction. It is to be noted that a magnification change in the subscanning direction is effected optically by changing the speed of the first mirror during the course of scanning. An image quality processing section 205 executes gamma correction, error diffusion and dither processing with the image data. The image data produced by the processing section 205 is fed out via a secrecy number adding circuit 206, an editing/manipulating circuit 207, and an interface (I/F) 208. The editing/manipulating circuit 207 is capable inverting black and white, masking, trimming, meshing, shadowing, and outlining. The circuits 206 and 207 may be switched if desired. The processing sections 203–208 are connected to the CPUs (a) and (b) and conditioned in a particular manner for each copy mode.

Characteristic features of the present invention will be described hereinafter.

Figure 7:
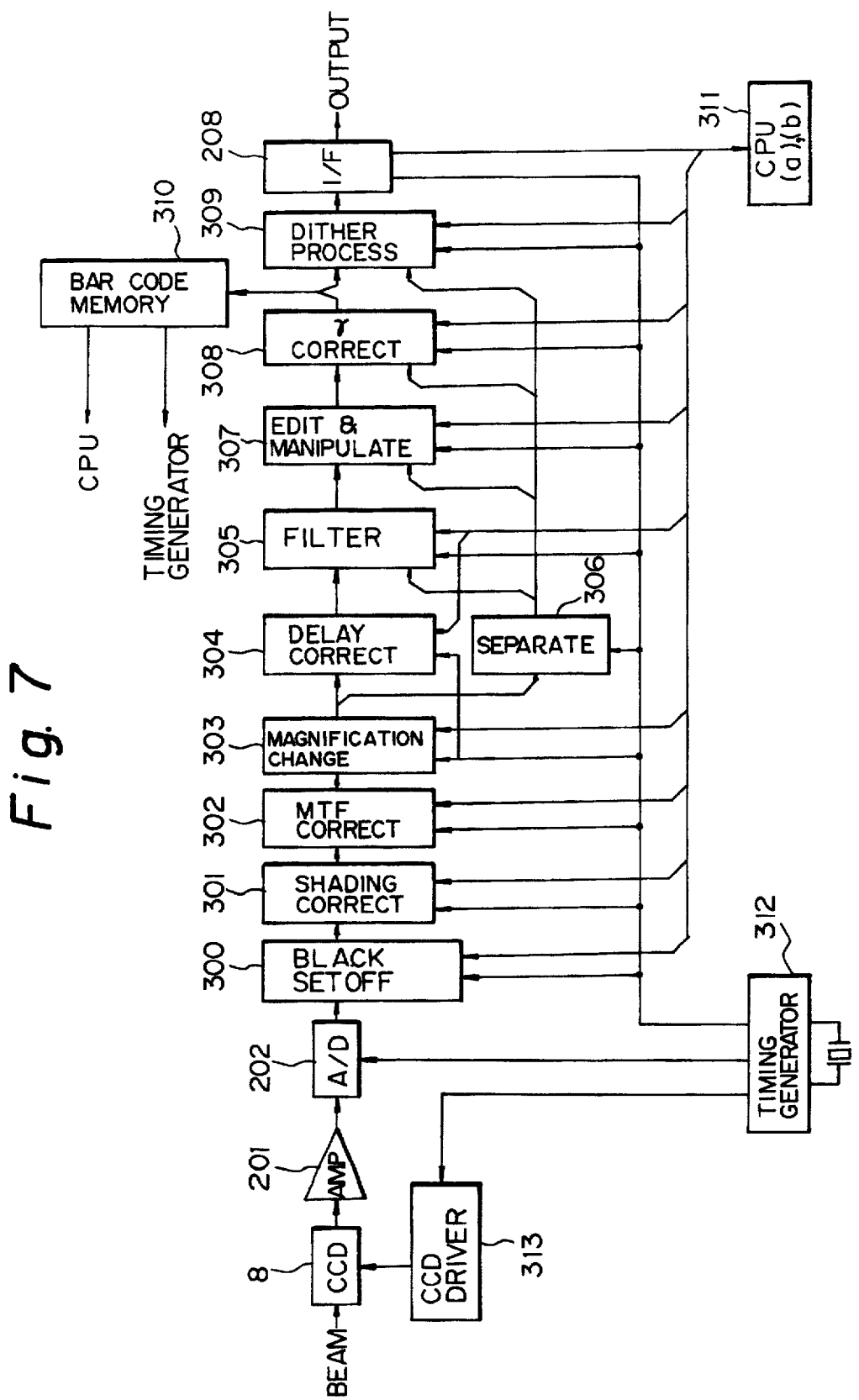
FIG. 7 is a block diagram schematically showing a signal processing circuit section included in the embodiment.

Referring to FIG. 7, there is shown signal processing circuitry for implementing generation image processing in accordance with the present invention. As shown, the circuitry includes a separating section 306 distinguishing a character, a mesh (offset printing) and continuous tonality (silver halide photographic pattern). A delay correcting section 304 corrects a pixel delay (deviation) particular to the separating section 306. A filter section 305 has three different functions, i.e., a smoothing function, a through function (no processing), and a sharpening function. An editing and manipulating section 307 executes various kinds of processing including black-white inversion, masking, trimming, meshing, shadowing, outlining, and line density equalization. A gamma correcting section 308 executes gamma correction matching the characteristic of a printer and, in addition, adjusts the density and contrast. A dither processing section 309 has five different dither patterns, i.e., 2×2, 3×3, 4×4, 16×16 and through dither patterns. A bar code memory 310 stores part of information read out of a document. There are also shown in FIG. 7 the CCD image sensor 8, AMP 201, ADC 202 and I/F 208 and a black setoff section 300, a shading correcting section 301, an MTF correcting section 302, a magnification change section 303, a CPU 311, a timing generator 312, and a CCD driver 313.

A reference will be made to FIG. 11 for describing the function of the bar code memory 310. As shown, assume that an original document [I] is copied to produce a duplicate [II]. Then, the memory 310 outputs a particular information pattern, e.g., a bar code 340 in a particular position of the duplicate [II]. When the duplicate [II] is to be copied to produce another duplicate [III], the memory 310 stores the content of the bar code 340 while transferring it to the CPU 311. When the duplicate [III] is to be outputted, the data stored in the memory 310 is deleted. Alternatively, when the duplicate [II] is to be copied to produce a duplicate [IV], the memory 310 stores the content of the bar codes 340 while transferring the data to the CPU 311. In the event of outputting the duplicate [IV], the data stored in the memory 310 is updated.

Figure 8:
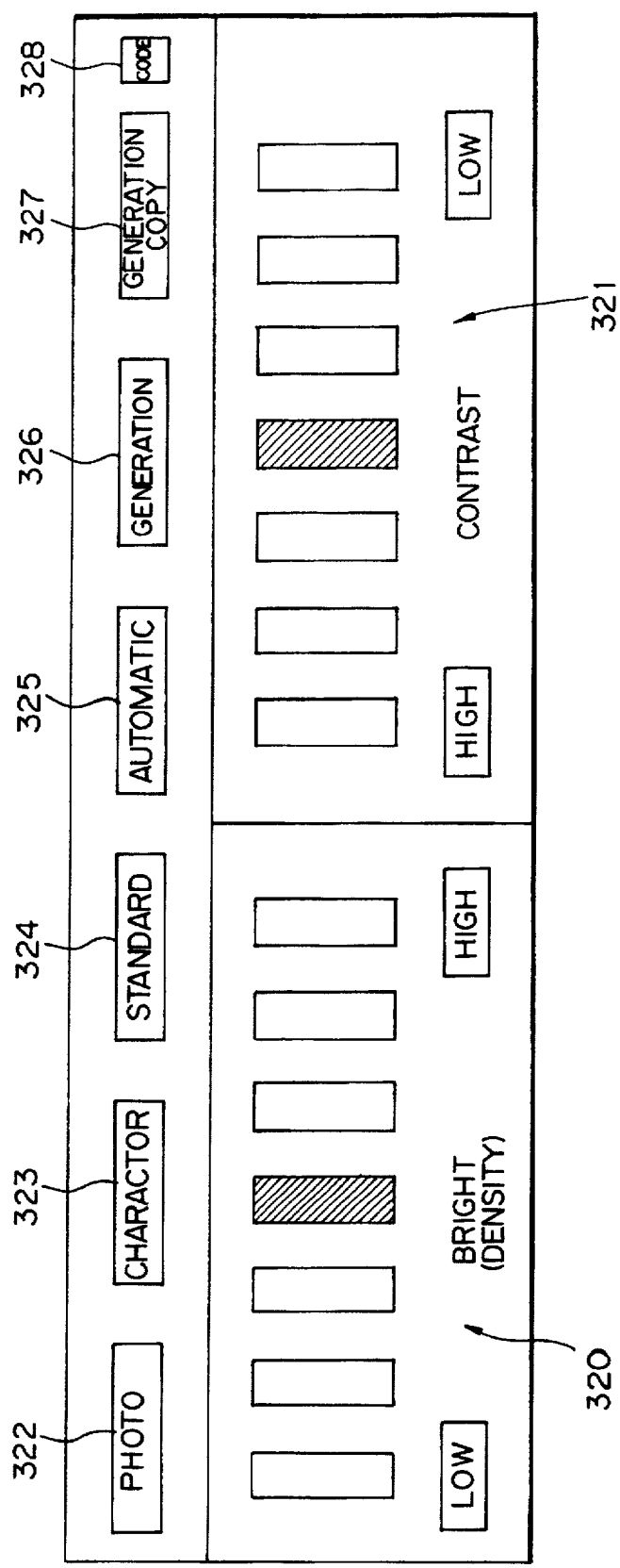
FIG. 8 is a plan view showing a specific arrangement of image quality keys on an operation unit included in the embodiment.
Figure 9:
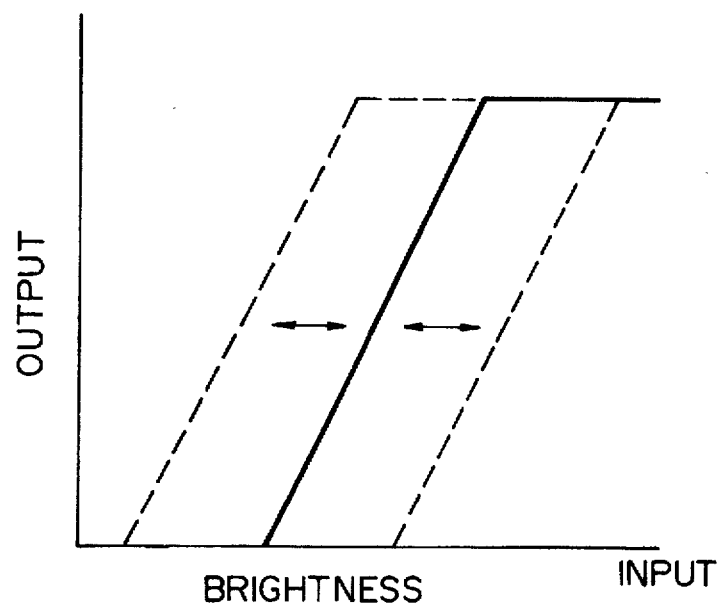
FIG. 9 is a graph indicative of how gamma correction data is shifted.
Figure 10:
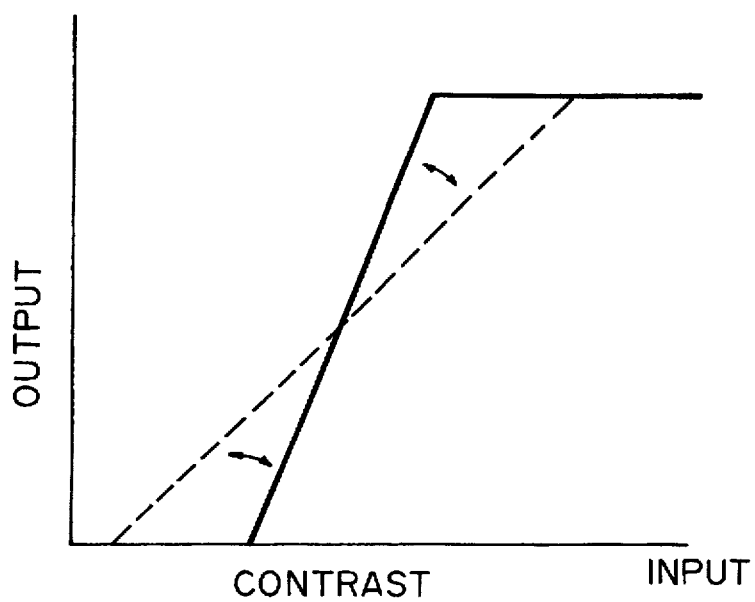
FIG. 10 is a graph indicative of how the gradient of gamma correction data is changed.
Figure 12:
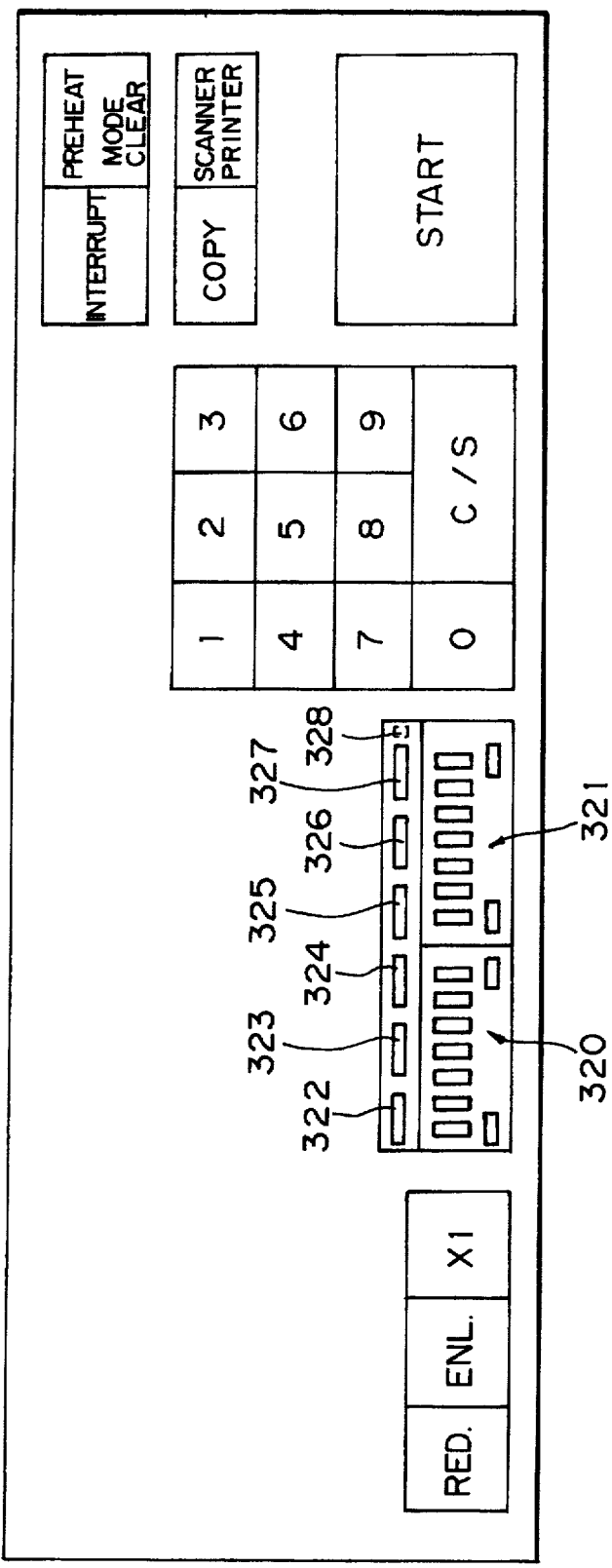
FIG. 12 is a fragmentary plan view showing a specific arrangement of the operation unit.

FIG. 12 shows a specific arrangement provided on an operation unit while FIG. 8 shows a specific arrangement of keys relating to image quality. As shown, bright (density) keys 320 and contrast keys 321 are accessible for effecting fine adjustment in various modes which will be described. Specifically, the bright keys 320 may be operated to shift gamma correction data and, therefore, the density, as shown in FIG. 9. The contrast keys 321 may be operated to change the gradient of gamma correction data and, therefore, the contrast, as sown in FIG. 10. Also shown in the figures are alpha (photograph, character, standard and automatic) keys 322, 323, 324 and 325, a generation key 326, a generation copy key 327, and a code key 328.

Photograph Mode

In a photograph mode, the filter section 305 selects a filtering function matching the photograph mode, i.e., the smoothing function in this case. The gamma correcting section 308 reduces the contrast. The dither processing section 309 selects the 4×4 dither pattern laying stress on tonality.

Character Mode

The filter section 305 sharpens the image while the gamma correcting section 308 increases the contrast. The dither pattern 309 does not execute dither processing.

Standard Mode

This mode is intermediate between the character mode and the photograph mode. The filter section 305 selects the through mode. The gamma correcting section 308 selects a standard contrast while the dither processing section 309 selects the 2×2 or 3×3 dither pattern.

Automatic Mode

The separating section 306 distinguishes characters, mesh and continuous tonality. Filtering, gamma correction and dither processing matching the kind of separated data are executed, as follows:

a) characters are processed in the same manner as in the character mode;

b) a mesh is processed in the same manner as in the photograph mode; and c) continuous tonality is processed by the filter section 305 selecting the through or sharpening function, the gamma correcting section 308 reducing the contrast, and the dither processing section 309 selecting the 4×4 dither pattern.

The functions described above are used in the following manner.

Figure 11:
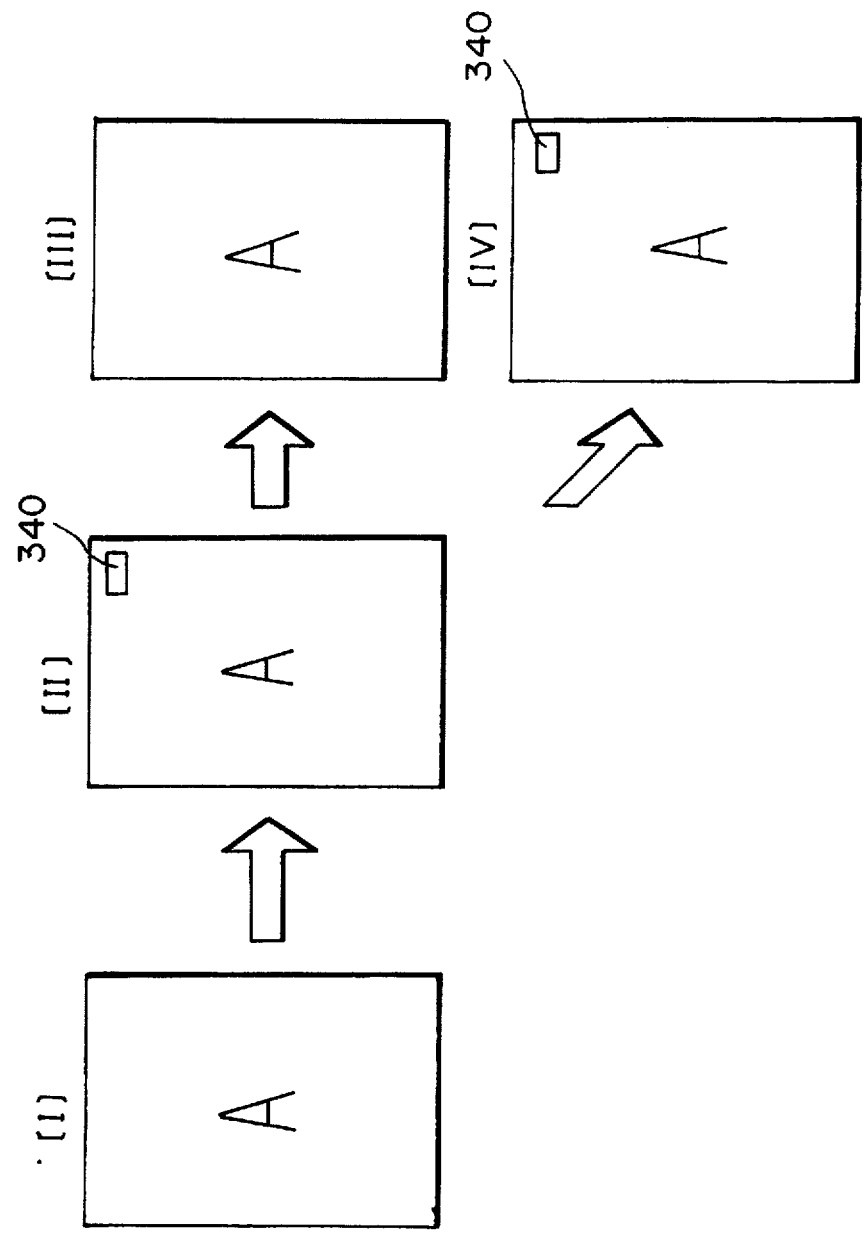
FIG. 11 shows an original document and generation images thereof representative of the function of a bar code memory included in the embodiment.

When the generation key 326, code key 328 and any one of the alpha keys 322–325 are selected, the duplicate [II], FIG. 11, is produced from the original document [I] and records copy information, or image processing information, in the form of the bar code 340, FIG. 11, by way of example. The copy information includes the type of the machine used for the generation, the number of times of reproduction, filter, gamma and dither modes, alpha key selected, and the result of automatic separation.

When the generation copy key 327 and code key 328 are selected, the duplicate or generation document [II], FIG. 11, is prescanned to store the bar code 340 in the memory 310. The CPU 311 reads the contents of the memory 310 and then selects optimal parameters matching the contents. Finally, the duplicate [III], FIG. 11, is outputted after the bar code data has been erased.

When the generation copy key 327, generation key 326 and code key 328 are selected, the generation document [III] is prescanned to store the information corresponding to the bar code 340 in the memory 310. By reading the contents of the bar code 340, the CPU 311 selects optimal parameters matching the contents. Then, the CPU 311 updates the bar code data of the memory 310. As a result, the copy [IV], FIG. 11 is outputted. When copy information is recorded in a duplicate as stated above, optimal parameters can be selected in the event of generation copy by referencing the copy information. This is successful in reducing the degradation of image quality.

Specific operations using the image processing information recorded on a sheet are as follows.

When the image processing information is indicative of the character mode, the MTF correcting section 302 operates in a usual manner. The filter section 305 and dither processing section 309 are conditioned for the character mode while the gamma correcting section 308 modifies the character mode in association with the process conditions.

When the image processing information is indicative of the photograph mode, the MTF correcting section 302 selects the smoothing function while the filter section 305 selects the through function or the sharpening function. The dither processing section 309 is conditioned for the photograph mode. The gamma correcting section 308 changes gamma of the standard mode in association with the process conditions.

Further, when the image processing information is indicative of the automatic mode, the MTF correcting section 302 effects smoothing. The others operate in the same manner as in the generation copy key and alpha key mode in matching relation to the result of image separation.

An image has been shown and described as being uniformly processed in one of the character, photograph, standard and automatic modes. Alternatively, when a single document consists of a plurality of different kinds of portions, the modes and the coordinates of the different kinds of portions may be recorded in a copy. Further, in the case of the automatic mode, the result of decision and the coordinates thereof may be recorded to enhance the performance.

Figures 13A, 13B, 14:
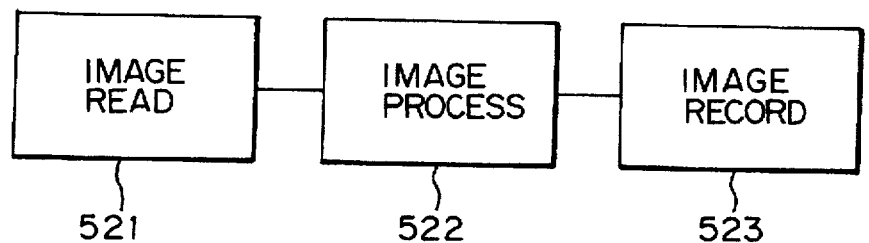
FIGS. 13A and 13B show specific smoothing matrices applicable to the embodiment.
FIG. 14 is a block diagram schematically showing a thickening and thinning procedure particular to the present invention.

While the embodiment simply causes the filter section 305 to select either of smoothing and sharpening, this section, in practice, selects an optimal parameter (low, medium or high smoothing, etc.) matching the image processing data. For example, the degree of smoothing will be low if the ratio of the coefficient of the pixel of interest to the coefficients of surrounding pixels is great (i.e. the former is sparingly influenced by the latter). FIGS. 13A and 13B show specific matrices for low smoothing and high smoothing, respectively.

As characters or lines are repetitively copied, they are noticeably thickened or thinned. This can be corrected if characters or lines are thinned or thickened once in a while, e.g., once in four times on the basis of the bar code 340.

When a copier is used to duplicate in the generation and code mode, a copy storing copy information recorded by another copier, it may operate in the generation copy and code mode or simply in the generation copy mode.

Of course, when the copy information cannot be read, the generation copy mode will be selected.

Further, when the copier executes the generation copy mode in order to produce a copy in the generation copy and code mode, it should preferably inform the operator of the generation copy mode.

A specific arrangement and procedure for thickening and thinning will be described hereinafter.

FIG. 14 schematically shows a copier having an image reading section 521 for scanning a document to generate digital image data, an image processing section 522 for processing the image data, and an image recording section 523 for printing the image data fed from the processing section 522 on a sheet.

Figure 15:
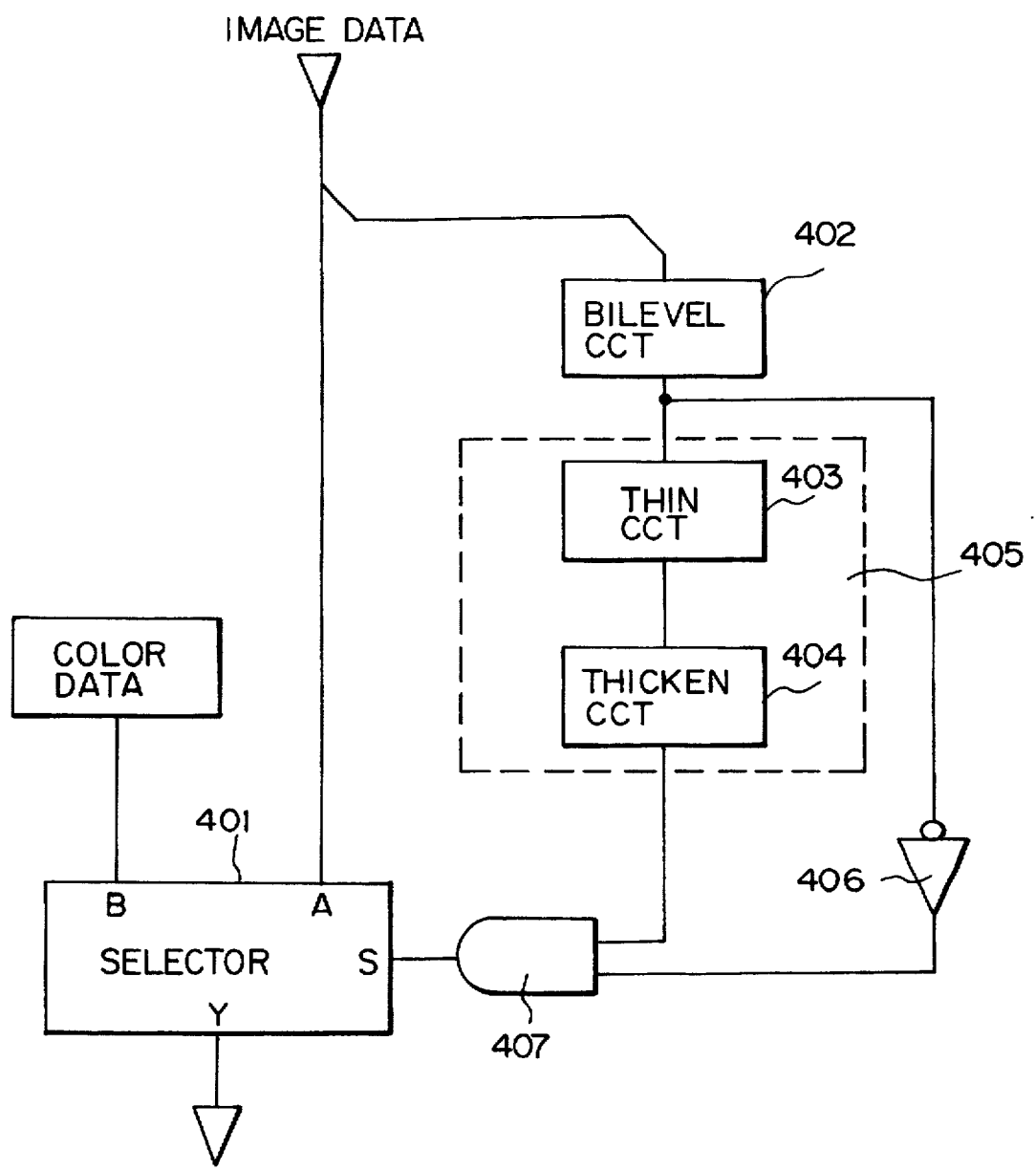
FIGS. 15 and 16 are block diagrams each schematically showing part of a specific form of thickening and thinning means.

FIG. 15 shows a specific construction of thickening and thinning means. As shown, image data is applied to a terminal A included in a selector 401 and a bilevel circuit 402. The output of the bilevel circuit 402 is fed to a processing section 405 made up of a thinning circuit 403 and a thickening circuit 404, and an inverter 406. The outputs of the processing section 405 and inverter 406 are applied to an AND gate 407. The result of the operation AND is delivered to a terminal S also included in the selector 401. Color data is applied to a terminal B further included in the selector 401.

Figure 17:
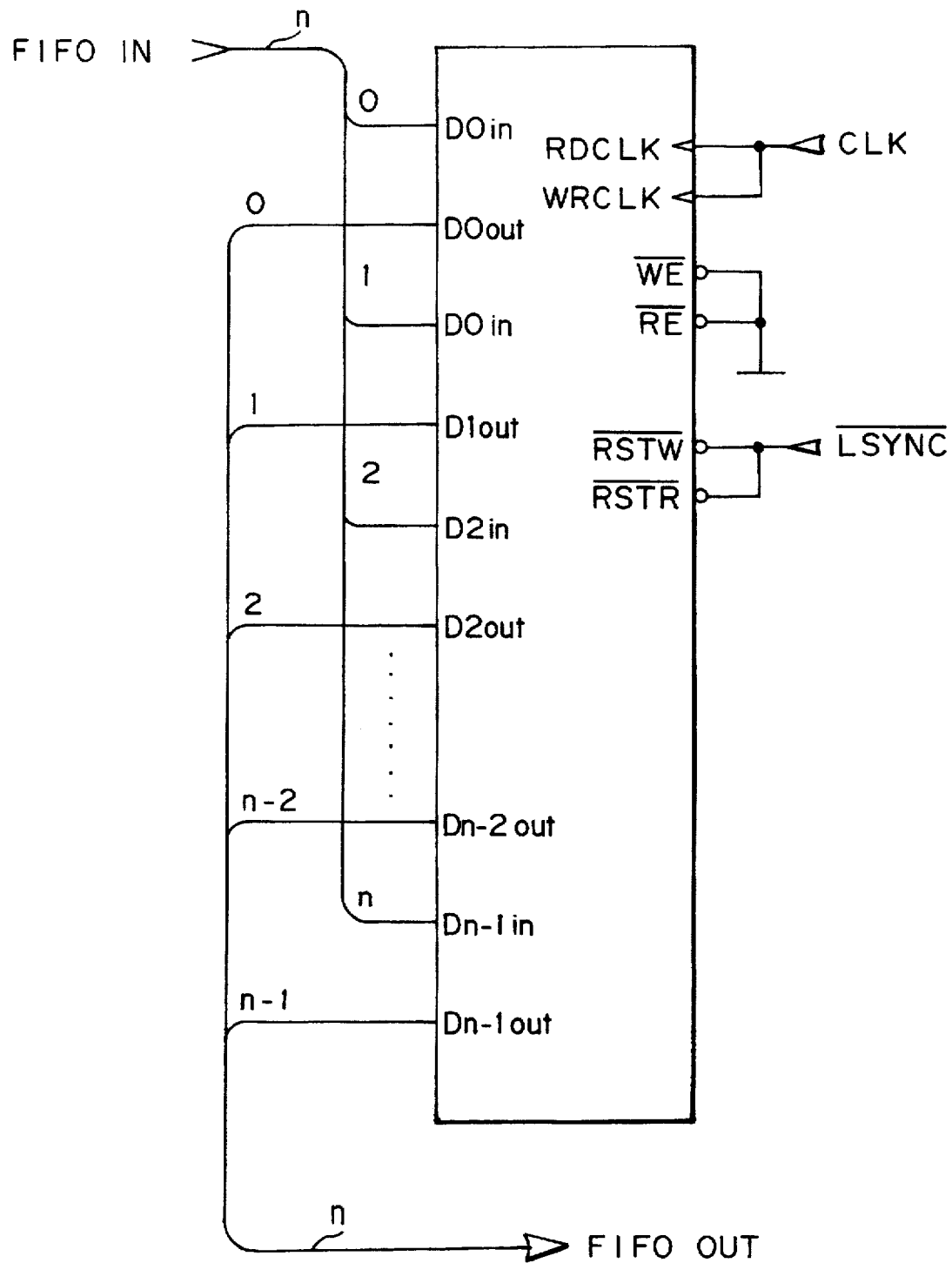
FIG. 17 is a block diagram schematically showing a specific construction of a line memory included in the thickening and thinning means.

FIG. 17 shows a line memory implemented by μPD42505C available from NEC (Japan). As shown, the line memory has a 5048 words×8 bits FIFO (First In First Out) structure.

Figure 16:
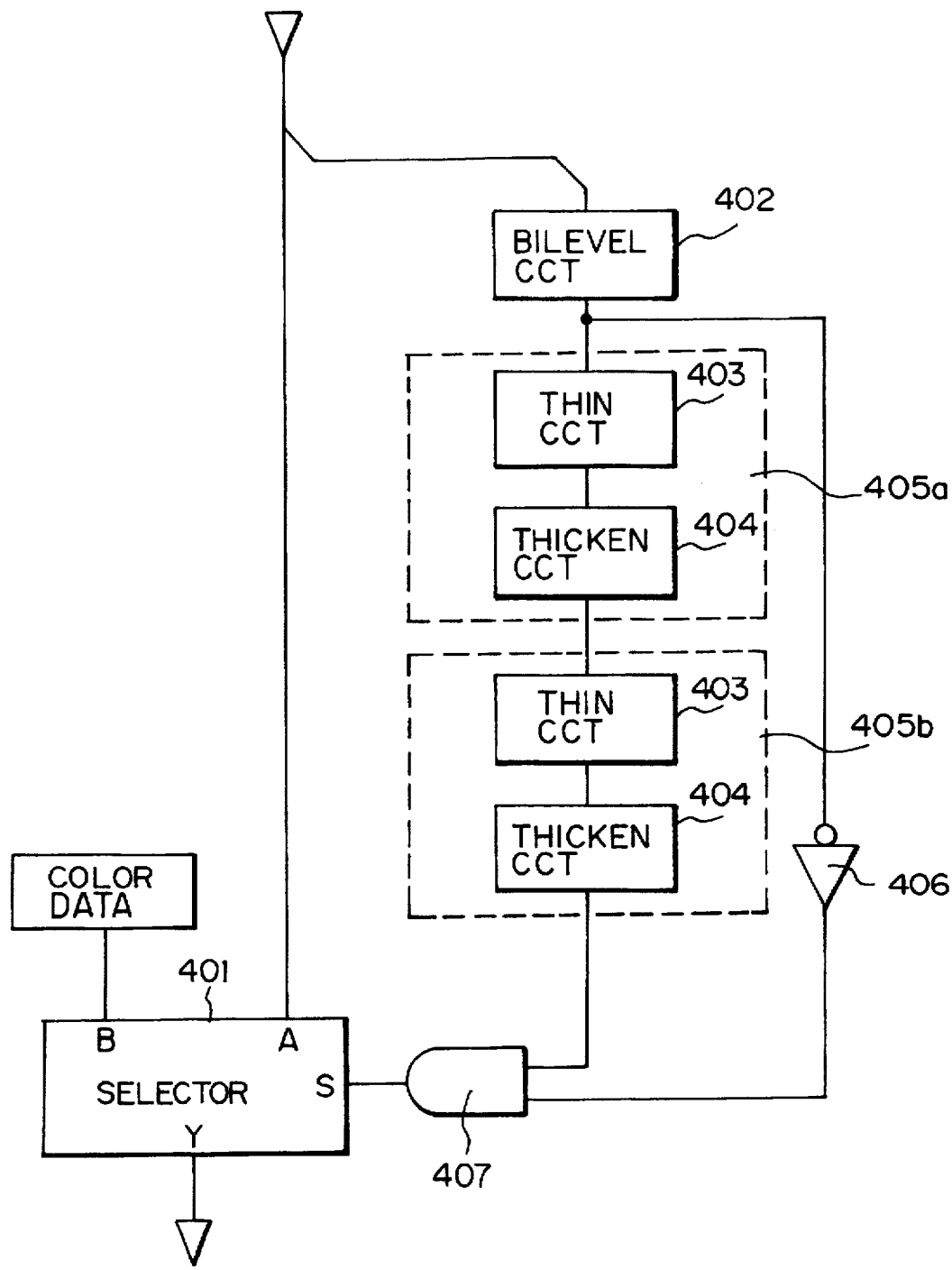

FIG. 16 shows another specific configuration of the thickening and thinning means. As shown, two processing sections 405a and 405b are connected in series to sequentially thicken and thin input image data.

Figure 18:
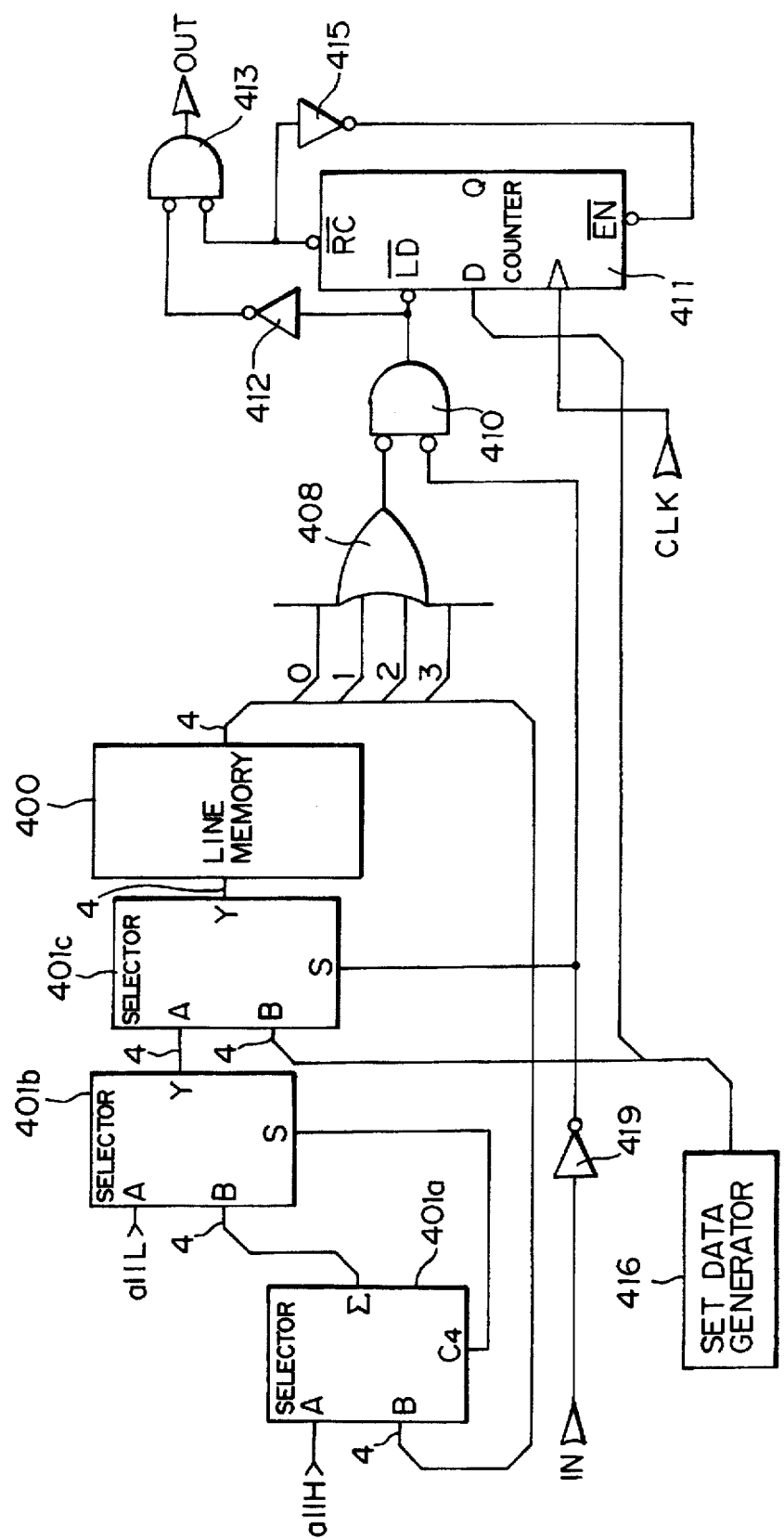
FIGS. 18 and 19 are block diagrams schematically showing respectively a thinning circuit and a thickening circuit which are other specific forms of the thickening and thinning means.

Referring to FIG. 18, a specific construction of a thinning circuit will be described. As shown, a selector 401a has an output terminal connected to a terminal B of a selector 401b whose output terminal is in turn connected to a terminal A of a selector 401c. The output terminal of the selector 401c is connected to the input terminal of a line memory 400. The output signal of the line memory 400 is routed through an OR gate 408 to a NOR gate 410. On the other hand, bilevel data IN is inverted by an inverter 419 and then applied to the NOR gate 410 and selector 401c. The output signal of the NOR gate 410 is fed to a counter 411 and to a NOR gate 413 via an inverter 412. A signal appearing on a terminal RC included in the counter 411 is applied to the NOR gate 413 and fed back to a terminal EN via an inverter 415. A set data generator 416 generates set data for thinning and delivers it to the selector 401c and counter 411.

In the configuration shown in FIG. 18, the set value for thinning is "4". When the bilevel data IN is (logical) ZERO, the selector 401c selects the thinning width "4" and delivers it to the line memory 400. In this condition, the outputs of the NOR gates 410 and 413 are each ZERO. When the bilevel data is (logical) ONE, the selector 401c writes a value read out of the line memory 400 and then decremented by 1 (one) ("0" if the read value is "0") in the line memory 400. If the value read out of the line memory 400 is "0", the output of the NOR gate 410 becomes ONE. The sequence of steps described so far is shown in FIGS. 20A and 20B; only an upper portion in the line (or subscanning) direction is thinned.

So long as the output signal of the NOR gate 410 is ZERO, the counter 411 continuously loads the thinning width "4" with ZERO appearing on the terminal RC thereof. Therefore, in this condition, the output signal of the NOR gate 413 is ZERO. When the output signal of the NOR gate 410 is ONE, the counter 411 counts down continuously until the signal on the terminal Q thereof becomes ZERO. Then, the signal on the terminal RC becomes ZERO to cause the counter 411 stop counting. When the output signal of the NOR gate 410 is ONE and the signal on the terminal RC of the counter 411 to is ZERO, the output signal of the NOR gate 413 is ONE. This is shown in FIGS. 20B and 20C; only a left portion in the main scanning direction is thinned.

Figure 19:
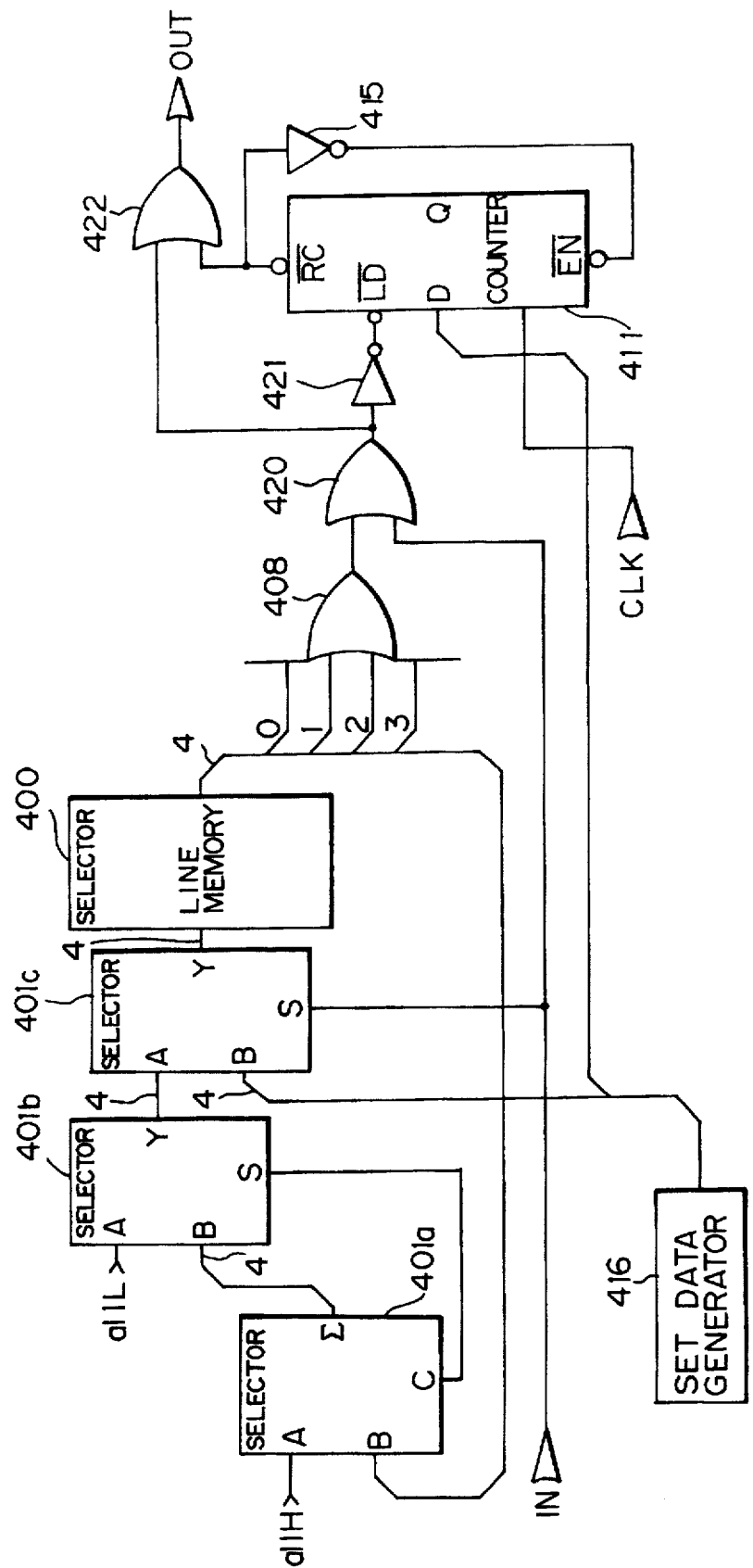
Figure 24:
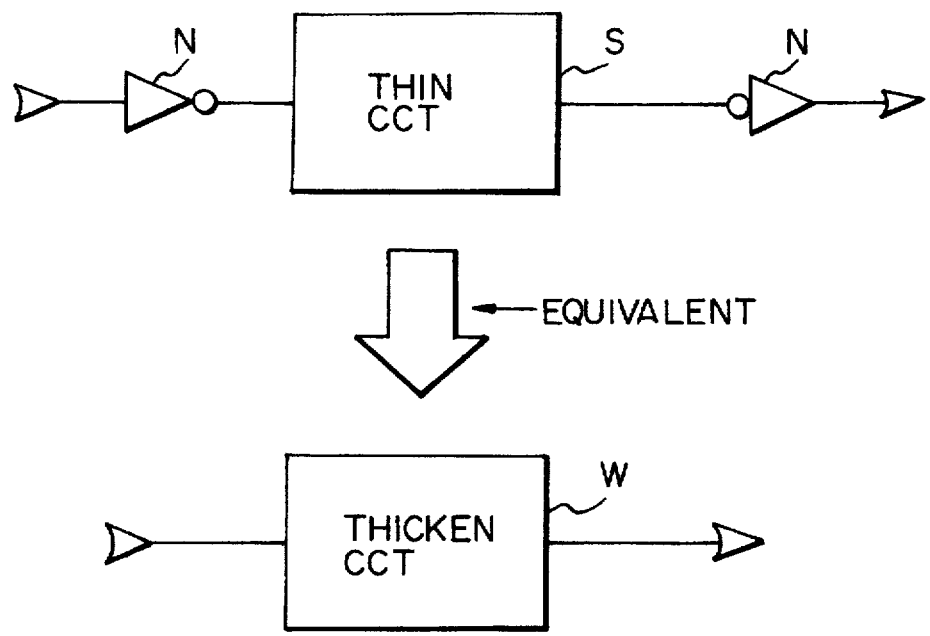
FIG. 24 is a block diagram schematically showing a relation between the thinning circuit and the thickening circuit.

FIG. 24 is a schematic block diagram indicative of a relation between the above-described type of thinning circuit S and thickening circuit W. As shown, the thinning circuit S is equivalent to the thickening circuit W when an inverter N is connected to each of the input and output thereof. FIG. 19 shows a thickening circuit equivalent to the thinning circuit shown in FIG. 18 when an inverter is connected to each of the input and output thereof. Specifically, the circuit of FIG. 19 is constructed by omitting the inverters 419 and 412 of the circuit of FIG. 18, replacing the NOR gates 410 and 413 with OR gates 420 and 422, and inserting an inverter 421 between the OR gate 420 and the counter 411.

Figure 21A:
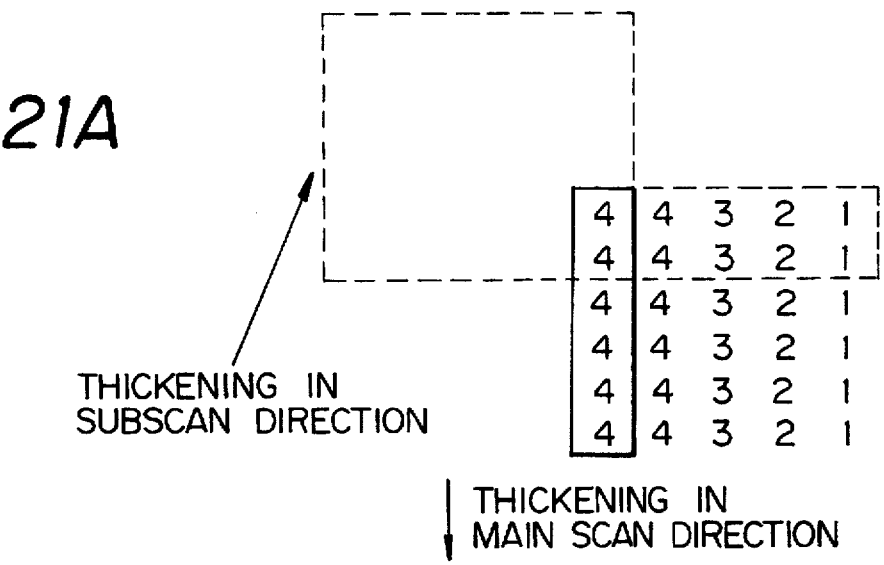
FIGS. 21A–21C demonstrate a thickening procedure to follow the procedure of FIGS. 20A–20C.
Figure 21B:
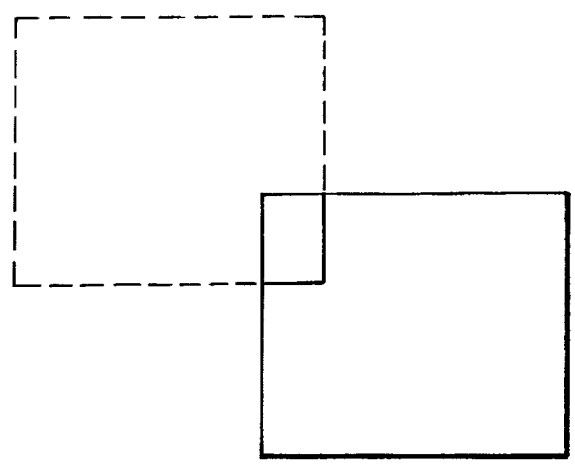
Figure 21C:
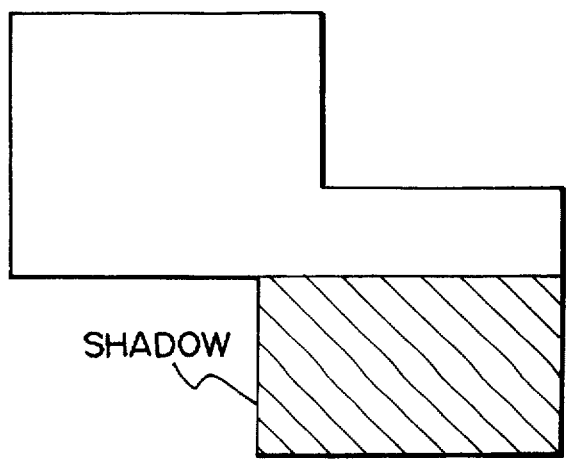
Figures 22A, 22B, 22C:
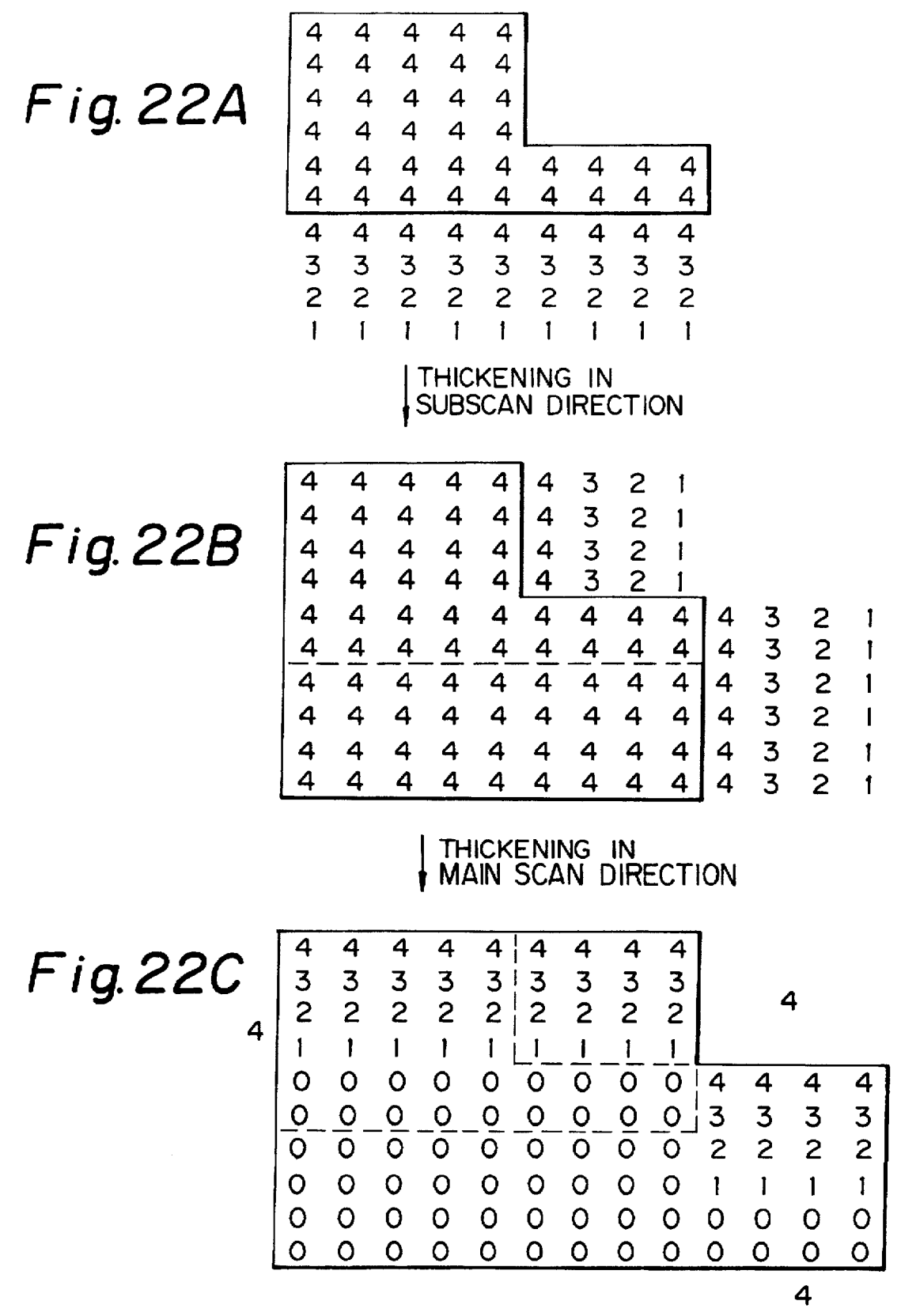

Referring to FIGS. 21A–21C, a specific thickening procedure is shown which will be obvious from the previously described thinning procedure. As shown, only a lower portion in the line (subscanning direction) is thickened in response to the output signal of the OR gate 420 by the steps shown in FIG. 20C and FIG. 21A. Then, only a right portion in the main scanning direction is thickened in response to the output signal of the OR gate 422 by the steps shown in FIGS. 21A and 21B. FIGS. 22A–22C and FIGS. 23A–23C demonstrate a procedure in which thickening (FIG. 22A–22C) and thinning (FIGS. 23A–23C) are sequentially effected in this order. This procedure will not be described since it is identical with the procedure of FIGS. 20A–20C and FIGS. 21A–21C except for the order.

By executing the combined thinning and thickening procedure as stated above, it is possible to move image data. In the specific procedure, the upper portion and left portion are deleted by thinning while the lower portion and right portion are added by thickening. However, image data can be moved in the same manner with no regard to the kind of thickening and thinning processing.

With the above thickening and thinning procedure, it is possible to thicken or thin image data by a memory of small capacity and to smooth the edges of images. Further, with the processing of FIGS. 20A–20C and 21A–21C, it is possible to move only large characters and logotypes and to prevent small characters and logotypes from being shadowed. On the other hand, when image data is thickened and then thinned by the procedure of FIGS. 22A–22C and 23A–23C, all the image data will be moved.

Figure 23A:
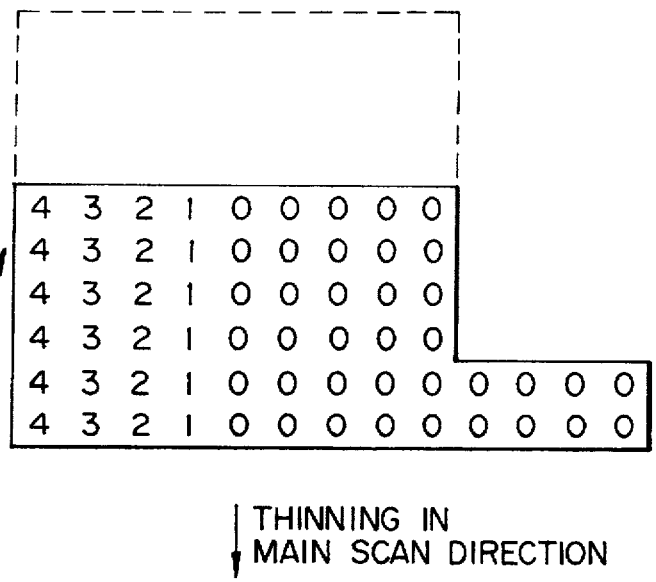
FIGS. 23A–23C are indicative of a thinning procedure to follow the procedure of FIGS. 22A–22C.
Figure 23B:
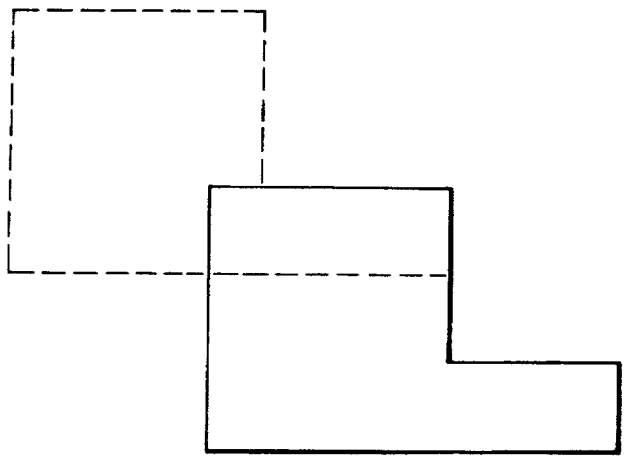
Figure 23C:
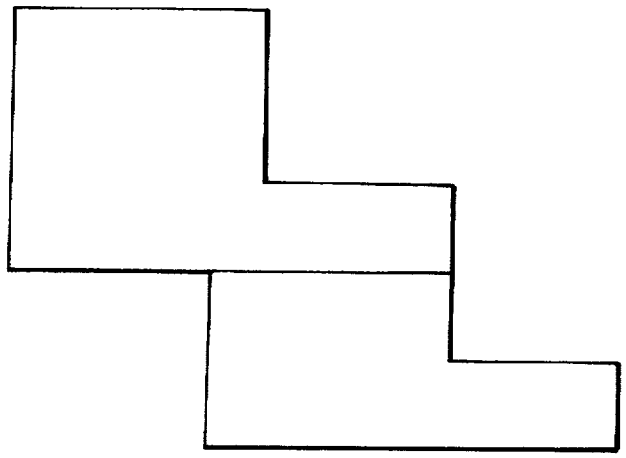

The previously stated image processing section 22 includes a color data generating section and a selector section which combine image data and color data in cooperation. Specifically, when bilevel data is absent and move data is present, color data is outputted; otherwise, image data is outputted. As a result, the image data is provided with a shadow as shown in FIG. 21C or 23C.

In the circuitry shown in FIG. 16, the thinning and thickening procedure is repeated a plurality of times to express the amount of movement in terms of the product of a thinning or thickening width and the number of times of reproduction in place of the simple thinning or thickening width. Hence, it is possible to move image data while leaving necessary irregular edges as they are, particularly to set a desired size of characters and logotypes to move if thickening is effected after thinning. It is noteworthy that any desired thinning width, thickening width and number of times of reproduction can be selected. For example, thinning with a width "5", thickening with a width "10" and thinning with a width "5" may be sequentially executed in this order.

In summary, it will be seen that the present invention provides an image processing apparatus capable of setting up optimal image quality parameters in the event when a reproduction of an original document or of preceding reproduction is to be copied by referencing previous image processing information. Even when the image processing information recorded in the original document or the preceding reproduction is illegible since, for example, it has been routed through another copier, a reproduction can be produced under different image conditions or such an occurrence can be reported to the operator to reduce the load on the operator.

Various modifications will become possible for those skilled in the art after receiving the teachings of the present disclosure without departing from the scope thereof.

What is claimed is:

1. An image processing apparatus for producing an image copy, said image processing apparatus comprising:

image reading means for reading an image and generating input image data;

recording means for recording said input image data;

control means for combining said input image data with image processing information representative of a processing history of said input image data and applying said image processing information to said image copy;

control means for processing said input image data and when said input image data includes the image processing information, performing both a thinning and thickening of lines of characters of the input image data to preserve a quality of the characters, in accordance with said image processing information; and a printing device which prints an image of the characters on a sheet after the lines thereof have been both thickened and thinned.

2. An apparatus as claimed in claim 1, wherein said image processing information includes information concerning the type of machine used for performing the recording of said image and the number of successive copies of a copy which have been made.

3. An apparatus as claimed in claim 1, wherein said image processing information comprises image quality conditions including a filter, gamma correction, and tone processing.

4. An image processing apparatus according to claim 1, wherein the control means for processing operates in accordance with a number of times an image has been copied which is represented in the image processing information.

5. An apparatus according to claim 1, wherein:

said control means first performs a thinning and then a thickening of the lines.

6. An image processing apparatus comprising:

image reading means for reading an image and generating input image data;

recording means for recording said input image data;

information reading means for reading image processing information recorded on a document, said image processing information representing a processing history of said image input data;

setting means for setting image quality conditions including both a thickening and a thinning of lines forming characters to preserve a quality of the characters when reproduced on a sheet on the basis of said image processing information read by said information reading means;

selecting means for determining whether or not to select said information reading means and said setting means on the basis of the image processing information recorded on said document; and a printing device which prints on a sheet the lines forming the characters after the line have been thickened and thinned.

7. An apparatus as claimed in claim 6, wherein if said image processing information is not recorded on said document, different image forming conditions are used.

8. An apparatus as claimed in claim 6, further comprising means for informing an operator of an occurrence that said image processing information is not recorded on said document.

9. An image processing apparatus according to claim 6, wherein the setting means sets the thickening and thinning of the lines forming the characters, depending on a number of copies made of the image which is represented in the image processing information.

10. An apparatus according to claim 6, wherein:

said printing means prints the lines after the lines have been first thinned and subsequently thickened.

11. A method of reproducing an image, comprising the steps of:

obtaining an image of a document and generating image data corresponding thereto;

storing the image data;

performing a first a thinning and subsequently a thickening of lines of characters of the image data to preserve a quality of the characters when reproduced on a sheet; and printing on a sheet the image data which has been thickened and thinned.

12. A method according to claim 11, further comprising the steps of:

obtaining an image of the sheet which has been printed in said printing step and generating image data of the sheet;

storing the image data of the sheet;

performing a thinning and thickening of lines of characters of the image data of the sheet to preserve a quality of the characters of the sheet when reproduced on a second sheet; and printing on a second sheet the image data of the characters of the sheet which has been thickened and thinned.

13. An image processing apparatus for producing an image copy, comprising:

image reading means for reading an image and generating input image data;

recording means for recording said input image data;

control means for processing said input image data by performing first a thinning and subsequently a thickening of lines of characters of the input image data to preserve a quality of the characters when reproduced on a sheet; and a printer which prints on a sheet the image data which has been thickened and thinned.

* * * * *

UNITED STATES PATENT AND TRADEMARK OFFICE
CERTIFICATE OF CORRECTION

PATENT NO. : 5,801,844
DATED : September 1, 1998
INVENTOR(S) : Shinji YAMAKAWA, et al.

It is certified that error appears in the above-identified patent and that said Letters Patent is hereby corrected as shown below:

On the title page, Item [63], the Related U.S. Application Data, is incorrect. It should be:

--Continuation of Ser. No. 43,736, Apr. 7, 1993, abandoned.--

Signed and Sealed this

Eighteenth Day of May, 1999

Attest:

Q. TODD DICKINSON

Attesting Officer    Acting Commissioner of Patents and Trademarks